(12) United States Patent
Yanagihara et al.

(10) Patent No.: US 6,593,383 B2
(45) Date of Patent: Jul. 15, 2003

(54) PROCESS FOR PREPARING POLYOLEFIN PRE-EXPANDED PARTICLES

(75) Inventors: Yutaka Yanagihara, Settsu (JP); Masahide Ebisui, Hyogo-ken (JP); Naruhiko Akamatsu, Hyogo-ken (JP)

(73) Assignee: Kaneka Corporation, Osaka-Fu (JP)

( * ) Notice: Subject to any disclaimer, the term of this patent is extended or adjusted under 35 U.S.C. 154(b) by 0 days.

(21) Appl. No.: 10/157,434

(22) Filed: May 29, 2002

(65) Prior Publication Data

US 2002/0198270 A1 Dec. 26, 2002

(30) Foreign Application Priority Data

| | | |
|---|---|---|
| May 31, 2001 | (JP) | 2001-163931 |
| Sep. 11, 2001 | (JP) | 2001-275784 |
| Dec. 27, 2001 | (JP) | 2001-397681 |

(51) Int. Cl.$^7$ ................................................. C08J 9/22
(52) U.S. Cl. ........................... 521/58; 264/50; 264/51; 264/DIG. 9; 521/59; 521/60
(58) Field of Search .............................. 521/58, 59, 60; 264/DIG. 9, 50, 51

(56) References Cited

U.S. PATENT DOCUMENTS

| | | |
|---|---|---|
| 4,379,859 A | 4/1983 | Hirosawa et al. |
| 4,689,351 A | 8/1987 | Endo et al. |
| 5,550,170 A | 8/1996 | Träger et al. |
| 6,130,266 A | 10/2000 | Mihayashi et al. |

FOREIGN PATENT DOCUMENTS

| | | |
|---|---|---|
| JP | 7-5784 | 1/1995 |

OTHER PUBLICATIONS

European Search Report Corresponding to European Application No. EP 02 01 1673 From the European Patent Office Dated Aug. 30, 2002.

*Primary Examiner*—Morton Foelak
(74) *Attorney, Agent, or Firm*—Brinks Hofer Gilson & Lione

(57) ABSTRACT

To provide a process for preparing polyolefin resin pre-expanded particles which enables to prepare pre-expanded particles having lower fluctuation in expansion ratios.

Polyolefin resin pre-expanded particles are prepared by a process comprising steps of dispersing polyolefin resin particles into an aqueous dispersion medium in an autoclave; heating the resin particles to temperature of at least the softening point of the polyolefin resin and pressuring the same; releasing said resin particles from the autoclave through a release port into an atmosphere of lower pressure than the inner pressure of the autoclave; thereby pre-expanding the resin particles, wherein at the releasing step, the resulting pre-expanded particles are contacted with gas of at least 60° C. and collided with a collision board or a container wall disposed at a distance of 5 mm<D, D representing the distance from the release port to the collision board or the container wall.

16 Claims, 4 Drawing Sheets

PROCESS FOR PREPARING POLYOLEFIN PRE-EXPANDED PARTICLES

BACKGROUND OF THE INVENTION

The present invention relates to a process for preparing polyolefin resin pre-expanded particles. Specifically, the present invention relates to a process for preparing polyolefin resin pre-expanded particles which can be suitably used as a raw material for in-mold foamed articles. In addition, the present invention relates to polyolefin resin pre-expanded particles obtained by the process and a flow-restricting device equipped with a pipe, which is used at a release port to prepare polyolefin resin pre-expanded particles.

Conventionally, there have been processes for preparing pre-expanded polyolefin resin particles which comprises steps of: dispersing polyolefin resin particles into an aqueous dispersion medium in an autoclave; heating the mixture; impregnating blowing agent thereinto; and releasing the particles into a low-pressure vessel to obtain polyolefin resin pre-expanded particles of a desired shape such as sphere, cylinder, ellipse or cube (Japanese Examined Patent Publication No. 5784/1995). As blowing agents, volatile blowing agents such as organic volatile blowing agents, inorganic gas and water are used (International Publication 97/38048 Pamphlet (1997)). As organic volatile blowing agents, propane, butane, pentane, trichlorofluoromethane and dichlorodifluoromethane are known (Japanese Unexamined Patent Publication No.77174/1977).

However, in case of preparing pre-expanded particles having expansion ratio of at most 15 times according to the above process, impregnation unevenness of blowing agents to resin particles are increased because it is necessary to reduce the amount of the blowing agent. As a result, fluctuation in expansion ratio calculated by the following formula (I) becomes as high as at least 20%, and pre-expanded particles having excellent properties cannot be obtained. Fluctuation in expansion ratio is calculated by the following formula (I):

$$\text{Fluctuation in expansion ratios } (\sigma/Xp)(\%) = (\sigma_m/K_{av}) \times 100 \quad (I)$$

In the formula, $K_{av}$ represents average expansion ratio calculated by the equation $K_{av} = \Sigma\{K_i \times W_i\}$ based on weight percentage $W_i$ and expansion ratio $K_i$ of the remaining foamed particles after screening through JIS Z 8801 standard screens (eight screens: 3.5, 4, 5, 6, 7, 8, 9, and 10 mesh); and $\sigma_m$ represents standard deviation calculated by the equation $\sigma_m = \sqrt{\Sigma\{W_i \times (K_{av} - K_i)^2\}}$ based on weight percentage $W_i$ and expansion ratio $K_i$ of the remaining foamed particles after screening through JIS Z 8801 standard screens (eight screens: 3.5, 4, 5, 6, 7, 8, 9, and 10 mesh).

When fluctuation in expansion ratios of pre-expanded particles is increased, pre-expanded particles having desired expansion ratio are difficult to obtain in the process for preparing pre-expanded particles. Accordingly, it becomes difficult to control expansion ratios, with yield being lowered at the same time. In addition, there is a problem that fluctuation in weights of in-mold foamed articles obtained by using pre-expanded particles as a raw material is increased and it becomes difficult to produce in-mold foamed articles having excellent properties, and defective products are increased.

Furthermore, the above process has a defect that costs are increased since volatile blowing agent is used. In addition, the volatile blowing agent should not be used from the viewpoint of preventing progress of global warming and growth of ozone hole.

Japanese Unexamined Patent Publication 4738/1986 discloses a process for preparing pre-expanded particles using polypropylene resin particles containing volatile blowing agent or inorganic gas, wherein the polypropylene resin particles contains 0.05 to 2% by weight of an inorganic substance such as aluminum hydroxide or calcium carbonate. When volatile blowing agent is used, there are cost and environmental problems as mentioned above. In addition, inorganic gas other than nitrogen and air, such as carbon dioxide should not be used because such gas contributes to greenhouse effect as well. Further, even if inorganic gas other than carbon dioxide, i.e., nitrogen or air is used, there have been problems that foamed articles are difficult to obtain and that even if foamed articles are obtained, they only have an apparent expansion ratio of at most 2 to 9 times because nitrogen or air has low permeability to polypropylene resin particles.

For these reasons, it is recently sought to develop processes which enable to produce polyolefin resin pre-expanded particles having desirable properties without using volatile blowing agent which has been considered to be necessary.

A process for preparing polyolefin resin pre-expanded particles without using volatile blowing agent is disclosed in Japanese Examined Publication No. 2183/1974. The process comprises steps of dispersing, into a dispersion medium, crystalline polyolefin polymer particles containing 10 to 70% by weight of a filler based on a polymer; keeping the obtained dispersed solution within a high pressure area in which the pressure is at least saturated vapor pressure of the obtained dispersed solution under a temperature condition of at most the melting point of the crystalline polyolefin polymer particles and such that crystallization of crystalline polyolefin polymer particles proceeds, thereby impregnating the dispersion medium into the polymer particles by means of volumetric shrinkage caused by the crystallization of the crystalline polyolefin polymer; and releasing the dispersed solution containing the obtained foamable crystalline polyolefin polymer particles from the high pressure area to a low pressure area, the pressure being lower than that of saturated vapor pressure of the dispersed solution and the temperature being at least the melting point of the crystalline polyolefin polymer particles.

However, though this process requires for a crystalline polyolefin polymer to contain 10 to 70% by weight of a filler based on the polymer to prepare pre-expanded particles, a molded article obtained by expanding such pre-expanded particles has a large amount of fillers, and thus deterioration of properties such as flexibility or cushioning property is unavoidable. Accordingly, such pre-expanded particles cannot be used for high level purposes and have a problem that they prevent particles from fusing with each other at the time of in-mold molding.

Further, Japanese Unexamined Patent Publication No. 22144/1985 suggests another process in which no volatile blowing agent is used. The process comprises steps of pressurizing a dispersed solution in which resin particles of a propylene-ethylene random copolymer having ethylene content of 1 to 12% by weight are dispersed by using inorganic gas such as nitrogen so that the inner pressure of the closed vessel reaches at least 5 kg/cm$^2$-G; and then keeping the dispersed solution at temperature of from at least the melting point of resin particles to at most 25° C. higher than the melting point to obtain pre-expanded particles having expansion ratio of at least 5 times.

However, when pre-expanded particles having high expansion ratio are to be prepared according to the above process, it is necessary that the ethylene content of the propylene-ethylene random copolymer resin particles is at least 4% by weight and that keeping temperature is at least 160° C. or keeping time is 10 hours. In addition, when additive resins such as polyethylene, an ethylene-vinyl acetate copolymer, Surlyn and polystyrene are used, pre-expanded particles to be obtained have large fluctuation in expansion ratio. In addition, mechanical strength and heat resistance inherently required for such polypropylene resin foamed articles are insufficient as in the case of the above pre-expanded particles obtained under the condition of ethylene content of at least 4% by weight. Besides, preparation under such keeping temperature and keeping time easily causes fusion of resin particles, which means that such preparation is non-productive and uneconomical.

On the other hand, Japanese Unexamined Patent Publication No. 176077/1998 discloses a process for preparing pre-expanded particles without using blowing agents, i.e., combustible gas such as butane and carbon dioxide gas, which contribute to the progress of global warming. That is, the process for preparing pre-expanded particles comprises steps of heating a polyolefin resin having 100 parts by weight of a polyolefin resin and 0.05 to 20 parts by weight of a hydrophilic polymer to prepare water-containing resin particles; releasing the water-containing resin particles into a lower pressure atmosphere. This is an innovative preparation process which enables to keep the fluctuation in expansion ratios to at most 15% even in case of pre-expanded particles having expansion ratio of as low as at most 15 times. However, further decreased fluctuation in expansion ratios has been desired in order to improve yield of pre-expanded particles in production steps and to prepare molded articles having less fluctuation in weights with excellent properties.

As mentioned above, it is still very difficult at present to obtain pre-expanded particles which can provide molded articles having excellent mechanical properties, heat resistance, water resistance, flexibility and cushioning property without using conventional volatile blowing agents, i.e., blowing agents such as carbon dioxide which are not preferable in view of promoting global warming and causing other environmental problems.

Furthermore, as to the release of resin particles, they are released through an orifice (a slit or a hole) once, which is provided on an orifice or nozzle flow-restricting device located at the release port (for example, Japanese Unexamined Patent Publication No. 197027/1983).

Examples of such orifice or nozzle flow-restricting devices located at the release port include a flow-restricting device having 1 to 10 slits which are 4 to 20 mm wide, 4 to 20 mm high and 5 to 200 mm deep at the narrowest part, or a flow-restricting device having 1 to 10 holes which has an area of 10 to 400 m$^2$ and 5 to 200 mm deep at the narrowest part.

However, when lowly pre-expanded particles having an expansion ratio of 2 to 15 times are to be prepared by using the above flow-restricting device, fluctuation in expansion ratios becomes as high as at least 20%, making it impossible to prepare pre-expanded particles with excellent properties.

SUMMARY OF THE INVENTION

An object of the present invention is to solve the above problems in prior arts and to provide a process for preparing polyolefin resin pre-expanded particles having further reduced fluctuation in expansion ratios.

Another object of the present invention is to provide a process for preparing polyolefin resin pre-expanded particles having excellent low expansion ratio or excellent high expansion ratio and low fluctuation in expansion ratios without using volatile blowing agent or carbon dioxide gas by using water in polyolefin resin particles as effective blowing agent, and pre-expanded particles obtained by the process.

The present invention enables to prepare polyolefin resin pre-expanded particles having further reduced fluctuation in expansion ratios by the process comprising steps of: dispersing polyolefin resin particles into an aqueous dispersion medium in an autoclave; heating the resin particles to temperature of at least the softening point of the polyolefin resin and pressurizing the same; releasing the resin particles from the autoclave through a release port into an atmosphere of lower pressure than the inner pressure of the autoclave, thereby pre-expanding the resin particles, wherein at the releasing step, pre-expanded particles are collided with a collision board or a container wall. In addition, it has been confirmed that the process has an effect to improve expansion ratio as compared with the case without collision. It has also been found that the amount of the blowing agent to be used can be reduced and there is an effect of achieving energy saving.

In addition, preparation of polyolefin resin pre-expanded particles having a desired expansion ratio and properties has been completed without using volatile blowing agents by vigorously colliding resin particles released from the released port with a collision board or container wall to evaporate water in the resin particles instantaneously.

Furthermore, it has been found that pre-expanded particles having an expansion ratio of at least 10% can be obtained by changing the shape of the flow-restricting device used for the release port to a particular shape different from conventional board, and the present invention has been completed.

That is, the present invention relates to a process for preparing polyolefin resin pre-expanded particles, comprising steps of: dispersing polyolefin resin particles into an aqueous dispersion medium in an autoclave; heating the resin particles to temperature of at least the softening point of the polyolefin resin and pressurizing the same; releasing the resin particles from the autoclave through a release port into an atmosphere of lower pressure than the inner pressure of the autoclave, thereby pre-expanding the resin particles, wherein at the releasing step, pre-expanded particles are collided with a collision board or a container wall located at a distance of farther than 5 mm from the release port.

It is preferable that the pre-expanded particles are contacted with gas of at least 60° C. and collided with a collision board or a container wall located at a distance of farther than 5 mm from the release port.

It is preferable that the pressurization is carried out by introducing inorganic gas selected from the group consisting of nitrogen gas, air and gas comprising those as a main component.

It is preferable that the pressurization is carried out with a pressure of 0.6 to 7.5 MPa.

It is preferable that the pre-expanded particles are collided with a collision board or a container wall at a collision angle of 5 to 85 degrees.

It is preferable that the polyolefin resin particles are released through a flow-restricting device equipped with a pipe.

It is preferable that the gas of at least 60° C. is selected from the group consisting of vapor, a mixture of vapor and air, heated air, mist-containing air, heated vapor and superheated vapor.

It is preferable that the gas of at least 60° C. is saturated vapor.

It is preferable that a pipe having an open area of 1.3 times larger than the open area of an orifice is integrally mounted on the flow-restricting device equipped with a pipe at the release side of an orifice board.

It is preferable that the flow-restricting device is equipped with at least one pipe which has H of at least 0.6 mm and L of at least 5 mm, H representing a width or a minor axis of a front face of the pipe and L representing a pipe length.

It is preferable that H is 3 to 25 mm and L is 5 to 300 mm.

It is preferable that the polyolefin resin particles are polypropylene resin particles.

It is preferable that the polypropylene resin particles comprise 100 parts by weight of a polypropylene resin and 0.01 to 20 parts by weight of a hydrophilic polymer.

It is preferable that the polyolefin resin particles contain 0.001 to 5 parts by weight of an inorganic filler.

It is preferable that the inorganic filler is talc.

The present invention also relates to polyolefin resin pre-expanded particles obtained by the process.

DETAILED DESCRIPTION

Figure 1:
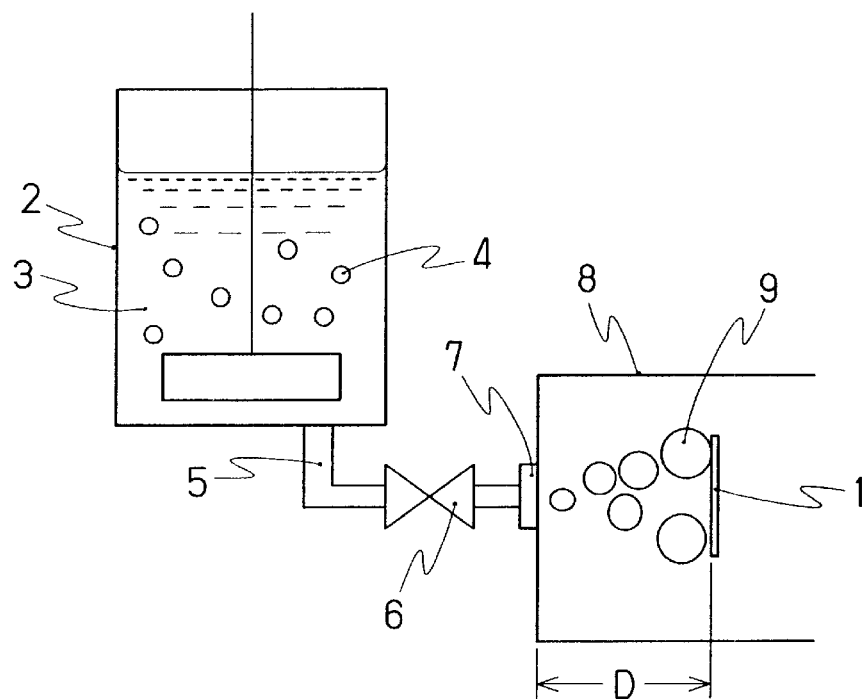
FIG. 1 is an explanatory view of apparatus for preparing pre-expanded particles equipped with a collision board used in the preparation process of the present invention.

The polyolefin resin used in the present invention comprises 50 to 100% by weigh of an olefin monomer unit and 0 to 50% by weight of a monomer unit copolymerizable with the olefin monomer. The lower limit of the amount of the olefin monomer unit is preferably 70% by weight, and the upper limit of the amount of the olefin monomer unit is preferably 99.9% by weight. Further, the lower limit of the amount of the monomer unit copolymerizable with the olefin monomer is preferably 0.1% by weight, the upper limit of the amount of the monomer unit copolymerizable with the olefin monomer is preferably 30% by weight. It is possible to obtain lightweight molded articles excellent in mechanical strength, processability, electrical insulation property, water resistance and chemical resistance since at least 50% by weight of an olefin monomer unit is used.

The monomer unit copolymerizable with the olefin monomer is a component used for the purpose of modifying adhesion, transparency, impact resistance and gas barrier property. In order to achieve an effect of the use, the monomer is used in an amount of at least 1% by weight, preferably at least 2% by weight, more preferably at least 5% by weight and most preferably at least 10% by weight based on the total weight of the resin.

Examples of olefin monomers include α-olefin monomers having 2 to 8 carbon atoms such as ethylene, propylene, butene, pentene, hexene, heptene and octene, and cyclic olefins such as norbornene monomer, but not limited thereto. The monomer may be used alone or in combination of two or more. Among these, ethylene and propylene are preferable from the viewpoint that they are inexpensive and improve properties of the polymer to be obtained.

Examples of monomers copolymerizable with the olefin monomer are vinyl alcohol ester such as vinyl acetate, alkyl (meth)acrylate whose alkyl group has 1 to 6 carbon atoms, such as methyl methacrylate, ethyl acrylate or hexyl acrylate, vinyl alcohol, methacrylic acid, vinyl chloride and the like, but not limited thereto. The monomer may be used alone or in combination of two or more. Among these, vinyl acetate is preferable from the viewpoint of adhesion, flexibility and low temperature characteristics, and methyl methacrylate is preferable from the viewpoint of adhesion, flexibility, low temperature characteristics and thermal stability.

The melt index (MI) of the above polyolefin resin, for example, polypropylene resin, is preferably 0.2 to 50 g/10 minutes, more preferably 1 to 30 g/10 minutes. The elastic modulus (JIS K 7203) of the above polyolefin resin, for example, polypropylene resin, is preferably 500 to 2,000 MPa, more preferably 800 to 1,600 MPa. The melting point of the above polyolefin resin, for example, polypropylene resin, is preferably 125 to 165° C., more preferably 130 to 160° C.

When the above MI is less than 0.2 g/10 minutes, it tends to be difficult to prepare pre-expanded particles having a high expansion ratio since the melt viscosity is too high. When the MI is more than 50 g/10 minutes, it tends to be difficult to prepare pre-expanded particles having a high expansion ratio because cells are easily broken due to low melt viscosity for elongation of the resin at expansion. When the flexural modulus is less than 500 MPa, mechanical strength and heat resistance tend to be insufficient. When flexural modulus is more than 2,000 MPa, flexibility and cushioning property of the obtained foamed articles tend to be insufficient. When the melting point is lower than 125° C., heat resistance tends to be insufficient. When the melting point is higher than 165° C., melt adhesion at molding and secondary expandability tend to be insufficient.

Examples of polyolefin resins are a polypropylene resin such as an ethylene-propylene random copolymer, an ethylene-propylene-butene random terpolymer, a polyethylene-polypropylene block copolymer or a propylene homopolymer; a polyethylene resin such as low density polyethylene, medium density polyethylene, high density polyethylene, linear low density polyethylene, an ethylene-vinyl acetate copolymer or an ethylene-methyl methacrylate copolymer; polybutene; polypentene; and the like, but not limited thereto. The polyolefin resins may be used without crosslinking, or after crosslinking by means of a peroxide or radiation. The polyolefin resin may be used alone or in combination of two or more. Among these, polypropylene resins are preferable because they have smaller fluctuation in expansion ratios than other polyolefin resins, and also because pre-expanded particles with a high expansion ratio can be easily obtained therefrom and molded articles made of the obtained pre-expanded particles have excellent mechanical strength and heat resistance as compared with other polyolefin resins.

As mentioned below, in case of using water as a blowing agent, it is preferable to use water-containing polyolefin resin particles whose water content is 1 to 50% by weight when heated to at least the softening temperature. In order to expand particles easily, resin particles comprising a polyolefin resin composition containing 0.01 to 20 parts by weight of a hydrophilic polymer based on 100 parts by weight of a polyolefin resin should be used.

The above hydrophilic polymer refers to polymers whose water absorption measured according to ASTM D570 is at least 0.5% by weight. The polymer includes so-called hygroscopic polymers, water-absorptive polymers (which are water-insoluble, absorb water in an amount of several to several hundreds times the weight of its own, and are not easily dehydrated even under pressure) and water-soluble polymers (which are dissolved in water at ordinary temperature or high temperature). Such hydrophilic polymers may contain, in their molecule, hydrophilic groups such as carboxyl group, a hydroxyl group, an amino group, an amido group, an ester group and a polyoxyethylene group.

Examples of hygroscopic polymers are carboxyl group-containing polymers, polyamides, thermoplastic polyester elastomers, cellulose derivatives, and the like.

Concrete examples of carboxyl group-containing polymers are an ethylene-acrylic acid-maleic anhydride terpolymer (water absorption: 0.5 to 0.7% by weight), an ionomer resin (water absorption: 0.7 to 1.4% by weight) obtained by forming a salt from a carboxyl group of an ethylene-(meth) acrylate copolymer using alkaline metal ions such as sodium ion or potassium ion to cross-link copolymer molecules, and an ethylene-(meth)acrylate copolymer (water absorption: 0.5 to 0.7% by weight). Concrete examples of polyamides are nylon-6 (water absorption: 1.3 to 1.9% by weight) nylon-6,6 (water absorption: 1.1 to 1.5% by weight) and nylon copolymer (available from EMS-CHEMIE AG, trade name: Gryltex) (water absorption: 1.5 to 3% by weight). Concrete examples of thermoplastic polyester elastomers are a block copolymer comprising polybutylene terephtharate and polytetramethylene glycol (water absorption: 0.5 to 0.7% by weight). Concrete examples of cellulose derivatives are cellulose acetate and cellulose propionate. The polymer may be used alone or in combination of two or more.

Among hygroscopic polymers, ionomer resins are preferable because they have excellent dispersability to polyolefin resins and enable to obtain high water content polyolefin resin compositions even if added in a relatively small amount, making it possible to prepare pre-expanded particles having a desirable expansion ratio and low fluctuation in expansion ratios.

Examples of water-absorptive polymers are crosslinked polyacrylate polymers, starch-acrylic acid graft copolymers, crosslinked polyvinyl alcohol polymers, crosslinked polyethylene oxide polymers and isobutylene-maleic acid copolymers.

Examples of crosslinked polyacrylate polymers are crosslinked sodium polyacrylate polymers such as Aquaric (trade name) available from Nippon Shokubai Co., Ltd. and Diawet (trade name) available from Mitsubishi Chemical Corporation. Examples of crosslinked polyvinyl alcohol polymers are Aqua Reserve GP (trade name) available from The Nippon Synthetic Chemical Industry Co., Ltd.

Examples of crosslinked polyethylene oxide polymers are Aquacoke (trade name) available from Sumitomo Seika Chemicals Co., Ltd. Examples of isobutylene-maleic acid copolymers are KI Gel (trade name) available from Kuraray Co., Ltd. The polymer may be used alone or in combination of two or more.

Among the water-absorptive polymers, crosslinked polyethylene oxide polymers are preferable from the viewpoint of dispersability to polyolefin resins and achieving high water content even if used in a relatively small amount.

Examples of water-soluble polymers are poly(meth) acrylic acid polymers, poly(meth)acrylate polymers, polyvinyl alcohol polymers, polyethylene oxide polymers and water-soluble cellulose derivatives.

Concrete examples of poly(meth)acrylic acid polymers are polyacrylic acid, acrylic acid-ethyl acrylate copolymers and polymethacrylic-acid 2-hydroxyethyl. Concrete examples of poly(meth)acrylate polymers are sodium polyacrylate, sodium polymethacrylate, potassium polyacrylate and potassium polymethacrylate. Concrete examples of polyvinyl alcohol polymers are polyvinyl alcohol and vinyl alcohol-vinyl acetate copolymers. Further, concrete examples of polyethylene oxide polymers are polyethylene oxide having a molecular weight of few ten thousand to few million. Concrete examples of water-soluble cellulose derivatives are carboxylmethyl cellulose and hydroxyethyl cellulose. The polymer may be used alone or in combination of two or more.

The hygroscopic polymers, the water-absorptive polymers and the water-soluble polymers may be used alone or in combination of two or more.

The amount of the hydrophilic polymer is usually at least 0.01 part by weight, preferably at least 0.05 part by weight and more preferably at least 0.1 part by weight based on 100 parts by weight of a polyolefin resin depending on the kind of hydrophilic polymer, in order to obtain a polyolefin resin composition whose content is 1 to 50% by weight at the step of dispersing particles comprising polyolefin resin composition into an aqueous medium and heating the same to temperature of from at least the softening point of resin particles to at most 20° C. higher than the softening point. The amount of the hydrophilic polymer is at most 20 parts by weight, more preferably at most 10 parts by weight from the viewpoint of improving production stability and expandability at the preparation of pre-expanded particles, imparting mechanical strength and heat resistance to molded articles obtained from pre-expanded particles and reducing dimensional change when water is absorbed.

The water content can be adjusted by controlling heating temperature and/or heating time. When the water content is less than 1% by weight, expansion ratio tends to be less than 2 times. The water content is preferably at least 2% by weight, more preferably at least 3% by weight. When the water content is more than 50% by weight, dispersibility of resin particles to the aqueous dispersion medium is decreased to cause agglomeration of resin particles in the autoclave when preparing pre-expanded particles, and therefore uniform expansion tends to become difficult. The water content is preferably at most 30% by weight. The water absorption of the hydrophilic polymer is measured at room temperature and the water content of the hydrophilic polymer is measured at high temperature (melting point of the resin). Therefore, when the used hydrophilic polymer has a water absorption of at least 0.5% by weight, for example, a water content of at least 1% by weight is obtainable.

Since the water content is adjusted to 1 to 50% by weight by heating the resin particles to at least the softening temperature of the polyolefin resin composition in the present invention, it is possible to prepare pre-expanded particles having low fluctuation in expansion ratios with an expansion ratio of about 2 to 43 times, more preferably about 3 to 20 times, most preferably about 3 to 15 times. In addition, resin particles do not agglomerate in the autoclave when preparing pre-expanded particles, making it possible to obtain uniform pre-expanded particles.

Further, the fusion peak temperature measured at a temperature increase rate of 10° C./minute according to DSC (differential scanning calorimeter) is regarded as the softening temperature of the polyolefin resin composition.

The water content means the value under vapor pressure at not less than the temperature, and is calculated as follows.

That is, a 300 cc pressure ample is charged with 50 g of resin particles comprising the polyolefin resin composition, 150 g of water, 0.5 g of powdery basic calcium tertiary phosphate as a dispersant and 0.03 g of sodium n-paraffinsulfonate as an auxiliary dispersant, and it is sealed. Then, the mixture in the ample is subjected to heat treatment for three hours in an oil bath set at least to the softening temperature of the polyolefin resin composition. After cooling to room temperature, the mixture was took out from the ample and sufficiently washed with water, and the dispersant was removed therefrom. Weight (X) of the thus-obtained water-containing resin particles of a polyolefin resin composition from which water on the surface was removed is determined. Subsequently, the water-containing resin particles are dried in an oven set to temperature 20° C. higher than the melting point of the resin particles for three hours and cooled to room temperature to determine weight (Y) in a desiccator. The water content is calculated from these weights according to the following equation (II):

$$\text{Water content}(\%) = (X-Y)/Y \times 100 \quad \text{(II)}$$

In case where the polyolefin resin composition contains a filler or a hydrophilic polymer, the water content is determined based on the total thereof.

It is preferable to add a filler, i.e., an inorganic filler and/or an organic filler to the polyolefin resin composition of the present invention from the viewpoint that pre-expanded particles can be obtained, which has low fluctuation in expansion ratios, uniform cells and a relatively high expansion ratio.

Concrete examples of inorganic fillers are talc, calcium carbonate and calcium hydroxide. Among these inorganic fillers, talc is preferable from the viewpoint that pre-expanded particles can be obtained, which has low fluctuation in expansion ratios, uniform cells and a relatively high expansion ratio.

Organic fillers to be used are not particularly limited, and any one may be used as long as they are solid at temperature of at least the softening temperature of the polyolefin resin. Concrete examples of organic fillers are fluorine resin power, silicone resin powder and thermoplastic polyester resin powder.

The filler may be used alone or in combination of two or more.

The average particle diameter of the filler is not particularly limited, but preferably at most 50 $\mu$m, more preferably at most 10 $\mu$m from the viewpoint that pre-expanded particles having uniform cells and a relatively high expansion ratio can be obtained and that molded articles having excellent mechanical strength and flexibility can be obtained from the pre-expanded particles. The average particle diameter is preferably at least 0.1 $\mu$m, more preferably at least 0.5 $\mu$m from the viewpoint of secondary agglomeration and handling workability.

The amount of the filler is not particularly limited, but preferably at least 0.001 part by weight, more preferably at least 0.005 part by weight based on 100 parts by weight of a polyolefin resin from the viewpoint of obtaining pre-expanded particles having a relatively high expansion ratio. The amount of the filler is preferably at most 5 parts by weight, more preferably at most 3 parts by weight, and most preferably at most 2 parts by weight from the viewpoint that excellent fusion at molding is exhibited by using pre-expanded particles and molded articles having excellent mechanical strength and flexibility can be obtained from the pre-expanded particles.

The polyolefin resin particles used in the present invention tend to give pre-expanded particles having a bulk density of at most 40 g/L owing to instantaneous evaporation of water caused by the collision even if no filler is added. It is preferable to add a filler from the viewpoint that pre-expanded particles having a lower bulk density and uniform cells can be obtained.

The polyolefin resin composition containing a polyolefin resin, if necessary, a hydrophilic polymer and a filler is usually melt-kneaded by using an extruder, a kneader, a Banbury mixer, a roll or the like. Then, the composition is preferably formed into resin particles having a desired shape such as cylinder, elliptic cylinder, sphere, cube or rectangular parallelepiped which can be easily used for pre-expansion. Though there are no particular limitation for preparation conditions of the resin particles and the size of the resin particles, resin particles to be obtained by melt-kneading in an extruder usually have a weight of 0.5 to 5 mg/particle.

The process for preparing pre-expanded particles of the present invention is explained below.

First, the resin particles as mentioned above are dispersed into an aqueous dispersion medium containing a dispersant and an auxiliary dispersant in an autoclave; and the resin particles are heated to temperature of at least the softening point of the polyolefin resin and pressurizing the same to impregnate a blowing agent into resin particles.

As to the aqueous dispersion medium to which resin particles are dispersed, any one can be used as long as the above polyolefin resin is not dissolved in the medium. Normally, examples thereof are water or a mixture of water and at least one kind of ethylene glycol, glycerin, methanol and ethanol. Water is preferable from environmental and economical viewpoints.

Concrete examples of dispersants are inorganic salts such as calcium tertiary phosphate, basic magnesium carbonate, basic zinc carbonate and potassium carbonate, and clays such as bentonite and kaoline. Among these, inorganic salt, particularly calcium tertiary phosphate is preferable because it has a high dispersion force. The dispersant may be used alone or in combination of two or more.

On the other hand, examples of auxiliary dispersants are anion surfactants such as sodium dodecylbenzenesulfonate, sodium n-paraffinsulfonate, sodium $\alpha$-olefinsulfonate and sodium alkyl naphthalenesulfonate, and cation surfactants such as benzal conium chloride, alkyltrimethyl ammonium chloride and dialkyldimethyl ammonium chloride, but not limited thereto. Among these, anion surfactants, particularly sodium n-paraffinsulfonate is preferable because it gives excellent dispersion force and can be easily biodegraded. The auxiliary dispersant may be used alone or in combination of two or more.

The amount of resin particles to be dispersed into the above aqueous dispersion medium is preferably 3 to 100 parts by weight, more preferably 10 to 50 parts by weight, most preferably 10 to 75 parts by weight based on 100 parts by weight of the aqueous dispersion medium. When the amount of resin particles is less than 3 parts by weight, productivity is decreased and it is not economical. When the amount of resin particles is more than 100 parts by weight, resin particles tend to fuse with each other in the vessel during heating.

There is no particular limitation for the amount of these dispersant and auxiliary dispersant, and they may be used in an usual amount. Specifically, the amount of the dispersant is preferably 0.05 to 10 parts by weight based on 100 parts by weight of the resin particles. The amount of the auxiliary dispersant is preferably 0.0005 to 1 part by weight based on 100 parts by weight of the resin particles.

As to the temperature to heat the above resin particles, dispersant and auxiliary dispersant after dispersing the same into an aqueous dispersion medium in an autoclave, the lower limit thereof is at least the softening point, preferably at least the melting point, more preferably at least the melting point plus 5° C. of the polyolefin resin composition to be used. The upper limit thereof is at most the melting point plus 20° C., more preferably at most the melting point plus 15° C. For example, in case of using an ethylene-propylene copolymer whose melting point is 145° C., the heating temperature is preferably 145 to 165° C., more preferably 150 to 160° C. When the heating temperature is lower than 145° C., expansion tends to be difficult. When it is higher than 165° C., mechanical properties and heat resistance of the pre-expanded particles to be obtained tend to be insufficient, and the particles tend to melt and adhere to each other in the autoclave.

The melting point of the polyolefin resin composition is measured by using DSC (differential scanning calorimeter). That is, the melting point means the temperature of the fusion peak which appears when the composition is heated from 40 to 220° C. at an increase rate of 10° C./minutes, cooled to 40° C. at a drop rate 10° C./minutes and further heated to 220° C. at an increase rate 10° C./minutes.

After dispersing polyolefin resin particles into an aqueous dispersion medium in an autoclave, heating and pressurization are carried out in order to bring the condition of the autoclave to such temperature and pressure that resin particles can be expanded. Either treatment may be performed first since there is no influence on properties of pre-expanded particles, such as expansion ratio or fluctuation in expansion ratios.

As pressurizing gas, it is possible to use conventionally known volatile blowing agents and inorganic gases.

Concrete examples of volatile blowing agents are aliphatic hydrocarbons such as propane, i-butane, n-butane, i-pentane, n-pentane and hexane; alicyclic hydrocarbons such as cyclobutane, cyclopentane and cyclohexane; and halogenated hydrocarbons such as trichloromonofluoromethane, dichlorodifluoromethane, dichlorotetrafluoroethane, trichlorotrifluoroethane, methyl chloride, methylene chloride and ethyl chloride. The volatile blowing agent may be used alone or in combination of two or more. The amount of the volatile blowing agent is usually 2 to 50 parts by weight, preferably 5 to 50 parts by weight, more preferably 5 to 40 parts by weight based on 100 parts by weight of the polyolefin resin. When the amount is less than 2 parts by weight, desirable expansion ratio cannot be obtained. When the amount is more than 50 parts by weight, the blowing agent is too much to be impregnated to resin particles, only causing pressure increase.

Preferable examples of inorganic gas used for pressure adjustment of the autoclave are carbon dioxide, nitrogen, air, or inorganic gas containing the same as a main component (usually at least 50% by volume, preferably at least 70% by volume) and inert gas such as argon, helium or xenon, steam, oxygen, hydrogen or ozone in a small amount (usually at most 50% by volume, preferably at most 30% by volume), from the viewpoint of economical efficiency, productivity, safety and environmental compatibility. It is more preferable to use nitrogen from the viewpoint of economical efficiency, productivity, safety, environmental compatibility and large effect on lowering fluctuation in expansion ratios, and air from the viewpoint of safety and economical efficiency.

The pressure to be kept by using the inorganic gas is not particularly limited, but preferably 0.6 to 7.5 MPa, more preferably 0.6 to 5.0 MPa, further preferably 1.0 to 3.5 MPa, most preferably 1.0 to 3.0 MPa from the viewpoint of improving expansion ratio and lowering fluctuation in expansion ratios. When the pressure is less than 0.6 MPa, there is a tendency that resin particles do not expand sufficiently and thus pre-expanded particles having a desirable expansion ratio cannot be obtained. When the pressure is more than 7.5 MPa, there is a tendency that the cell of the obtained pre-expanded particles becomes too small and closed cell content is decreased to cause contraction of molded articles and decrease of dimensional stability, mechanical strength or heat resistance. The inorganic gas may be introduced before, during or after heating of the autoclave since the timing does not have great influence on properties of pre-expanded particles such as expansion ratio or fluctuation in expansion ratios.

In addition, the period from the moment that a predetermined pressure is achieved by pressurization with inorganic gas to the moment of the release of resin particles together with the aqueous dispersion medium into a lower pressure atmosphere is not particularly limited. The period is preferably at most 60 minutes, or as short as possible from the viewpoint of improvement of productivity. Further, it is preferable to keep the inner pressure of the autoclave to the above achieved pressure during the release.

The "lower pressure" in the expression "an atmosphere of lower pressure than the inner pressure of the autoclave" may be any pressure as long as it is lower than the inner pressure of the autoclave. Usually, a pressure near the atmospheric pressure is selected. The above "atmosphere" means the space including the track of the released aqueous dispersion (containing pre-expanded particles and aqueous dispersion medium). Generally, the atmosphere refers to the interior part of devices such as pipe and duct blocked from outside air.

In case of using a volatile blowing agent or inorganic gas (for example, carbon dioxide) as a blowing agent, a hydrophilic polymer need not be incorporated because it is not necessary to include water in the polyolefin resin particles. In this case, polyolefin resin particles may be prepared in the same manner as above except for not using any hydrophilic polymer, dispersed to an aqueous medium and the resulting mixture is heated, and a blowing agent is added thereto to impregnate the particles therewith. After adding the blowing agent, the pressure is 0.6 to 7.5 MPa, and the keeping time is 20 to 60 minutes in general.

In case of using water as a blowing agent, resin particles are dispersed into an aqueous dispersion medium, and the resulting mixture is heated and stirred for, for example, 30 minutes to 12 hours to form water-containing resin particles having a water content of 1 to 50% by weight. Thereafter, the pressure of the autoclave is adjusted to 0.6 to 7.5 MPa by introducing inorganic gas.

Subsequently, with keeping the pressure, the polyolefin resin particles are released into an atmosphere of lower pressure than the inner pressure of the autoclave and collided with a collision board or a container wall to obtain pre-expanded particles.

The collision board or container wall of the present invention is disposed to change spattering direction of resin particles released from the release port. In usual cases, a resin is cured to stop expansion when the temperature becomes the softening point or lower of the resin particles during pre-expansion. On the other hand, each resin particle is uniformly expanded to decrease fluctuation in expansion ratios when a mixture of resin particles and an aqueous dispersion medium is collided with a collision board or a container wall as in the present invention. It is considered that this is because the temperature and the humidity of atmosphere in which resin particles are expanded are more uniform. Furthermore, since most water in resin particles evaporates instantaneously on impact, serving as an effective blowing agent, expansion ratio can be increased as compared with the case without collision.

The collision board or the container wall may have any size as long as pre-expanded particles can be collided. The shape may be flat, convex or concave relative to the spattering direction of the pre-expanded particles. The material is not particularly limited, and examples thereof are metal, plastic, rubber, felt, ceramics and wood.

One of the processes of preparing pre-expanded particles having a smaller fluctuation in expansion ratios is to set the distance D from the release port to the collision board or the container wall to 5 mm<D. The distance D is preferably 5 mm<D<1,500 mm, more preferably 5 mm<D<1,000 mm, most preferably 10 mm<D<800 mm. When the distance is shorter than 5 mm, the distance between the release port and the collision board or container wall is short, resulting in a tendency that the resin particles are fused with each other at the release port and not easily expanded. When the distance is longer than 1,500 mm, the effect to lower the fluctuation in expansion ratios tends to be smaller depending on the condition of heating and pressurization of the autoclave. When the distance to the collision board or the container wall is too long, there is a tendency that pre-expanded particles are cooled before collision and not easily expanded, which means that high expansion ratio is not achieved. At the same time, uneven cooling among pre-expanded particles before collision leads to increase of fluctuation in expansion ratios. For these reasons, it is necessary to determine the distance D in accordance with atmosphere in which resin particles are expanded.

One embodiment of the present invention is explained referring to drawings. As shown in FIG. 1, the collision board 1 is usually located near the exit of the release port 7 in the low-pressure vessel 8. A valve 6 is opened and resin particles 4 heated and pressurized in the autoclave 2 are transferred to the low-pressure vessel 8 through releasing tube 5 and the release port 7 to be expanded. Numeral 3 in FIG. 1 represents an aqueous dispersion medium and numeral 9 represents pre-expanded particles.

Figure 2:
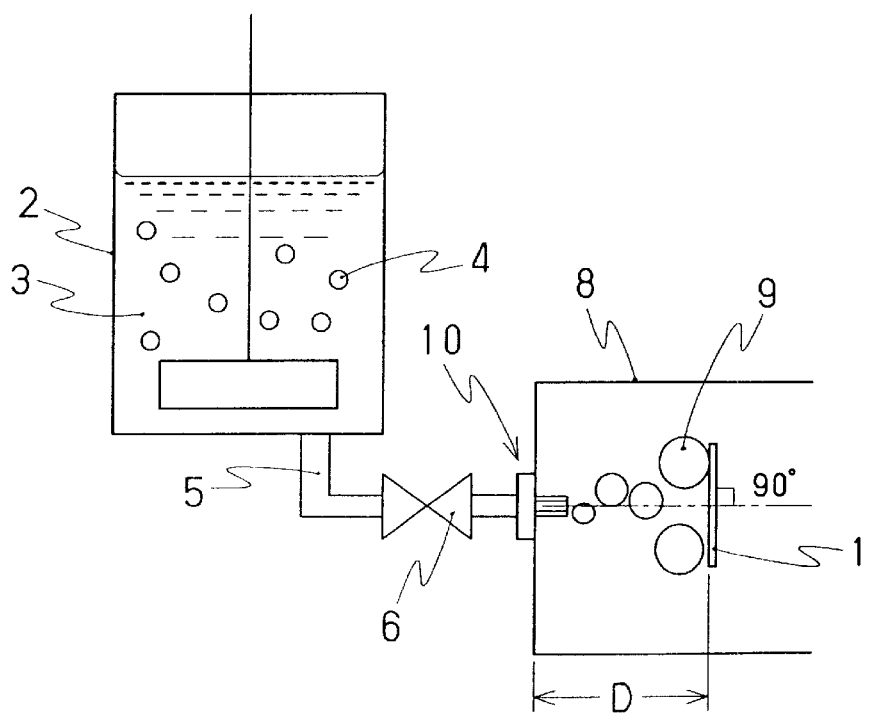
FIG. 2 is an explanatory view of apparatus for preparing pre-expanded particles equipped with a collision board and a flow-restricting device equipped with a pipe used in the preparation process of the present invention.
Figure 3:
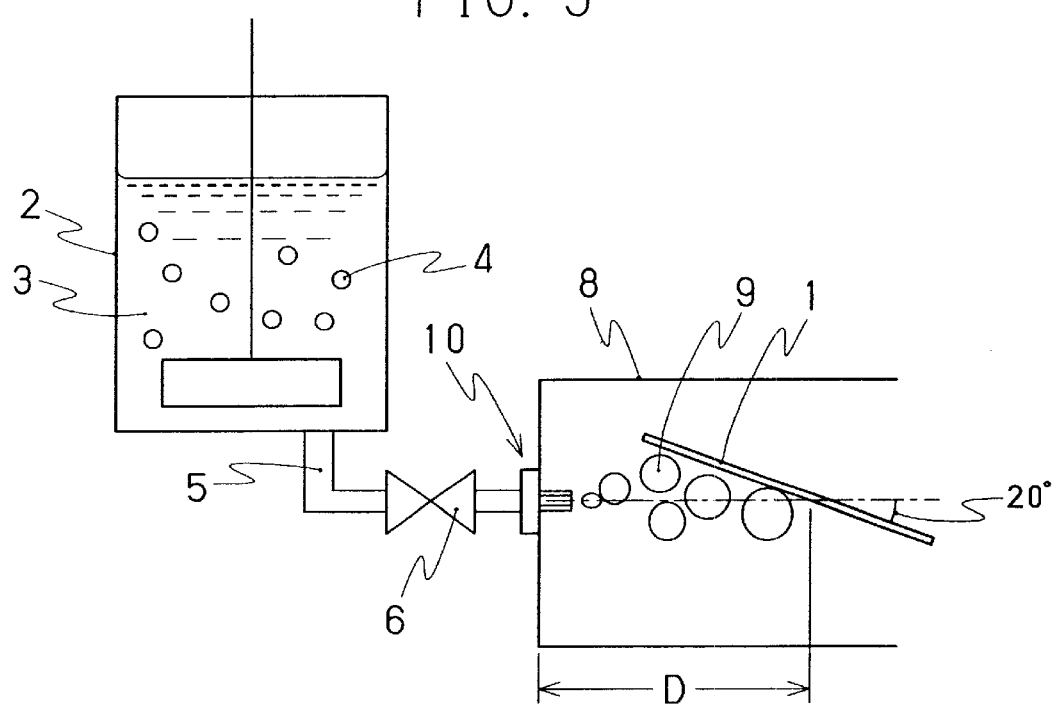
FIG. 3 is an explanatory view of apparatus for preparing pre-expanded particles equipped with a collision board and a flow-restricting device equipped with a pipe used in the preparation process of the present invention.

The collision angle to collide the pre-expanded particles with the collision board or the container wall is preferably 5 to 85 degrees. The collision angle in the present invention ranges from 0 degree to 90 degrees, and 0 degree refers to the case where particles are flied in parallel with the collision board 1 or the container wall and not collided therewith, while 90 degrees refers to the case where particles are collided squarely with the collision board 1 or the container wall as shown in FIG. 2 and FIG. 3.

The collision angle is not particularly limited as long as pre-expanded particles can be collided. The collision angle is preferably from 5 to 85 degrees, more preferably 10 to 45 degrees from the viewpoint that pre-expanded particles having uniform cell diameters can be obtained.

In the present invention, pre-expanded particles having smaller cell diameters on the side of the collided face and larger cell diameters on the other side of the collided face can be prepared by increasing the collision angle. Molding of such pre-expanded particles enables to obtain molded articles having different color tones. When change of color tone or uniform color tone of molded articles are desired, they can be achieved by reducing the impact at collision by setting the collision angle to less than 90 degrees, thereby reducing the difference of cell diameters at the side of collided face and the other side of the collided face in a pre-expanded particle.

A flow-restricting device is used at the release port to control the releasing time and to achieve uniform expansion ratios.

Examples of such flow-restricting devices are an orifice, nozzle or venturi flow-restricting device. These may be used in combination, but orifice flow-restricting devices are preferable because they can keep a constant releasing rate and produce pre-expanded particles having low fluctuation in expansion ratios and because the structure of the orifice flow-restricting devices is simple. As to an outlet to be provided on such flow-restricting devices, any one can be used as long as it has such a size that the outlet is not blocked with resin particles to be released and that pre-determined releasing rate can be achieved. There is no particular limitation for open area and sectional profile of the outlet.

Another process for preparing pre-expanded particles having low fluctuation in expansion ratios comprises contacting released pre-expanded particles with gas of at least 60° C. and colliding the particles with a collision board or a container wall.

The gas of at least 60° C. includes vapor, a mixture of vapor and air, heated air, mist-containing air, heated vapor and superheated vapor. Saturated vapor is more preferable from the viewpoint that shrinkage of pre-expanded particles is decreased and prevented, and fluctuation in expansion ratios is lowered.

In addition, examples of the method of contacting pre-expanded particles with a gas of at least 60° C. after releasing pre-expanded particles is a method in which a nozzle is provided at the outlet to blow the gas. Pre-expanded particles may be contacted with the gas for at least $1 \times 10^{-4}$ second. The position and number of nozzle for blowing gas are not particularly limited as long as the gas is at least 60° C., preferably at least 90° C., and preferably at most 130° C., more preferably at most 120° C. at the outlet. A preferable method is to contact released pre-expanded particles with the gas of at least 60° C. uniformly. The uniform contact of the gas of at least 60° C. enables to lower fluctuation in expansion ratios of pre-expanded particles. When the temperature of the lower pressure atmosphere is lower than 60° C., water in pre-expanded particles coagulates suddenly to increase shrinkage and fluctuation in expansion ratios of pre-expanded particles. Therefore, it becomes difficult to obtain pre-expanded particles having a high expansion ratio and excellent recovery effect on shrinkage caused by dryness. When the temperature of the lower pressure atmosphere is higher than 130° C., which is near the glass transition temperature or the softening point of the polyolefin resin, there is a tendency that cells of pre-expanded particles are broken and pre-expanded particles are fused with each other easily. Therefore, the temperature of the lower pressure atmosphere must be at least 60° C. and preferably at most 130° C.

The temperature of saturated vapor is adjusted to at most the melting point of the polyolefin resin, preferably within the range of 90 to 110° C. Further, saturated vapor pressure is adjusted to saturated vapor pressure at the melting point or lower of the polyolefin resin, more preferably 70 to 150 kPa. In this case, a certain amount of water may be sprayed together with the blowing of vapor. In addition, it may be possible to carry out procedures such as spraying water to control the cooling of pre-expanded particles after contacting saturated vapor.

Water content of pre-expanded particles (hereinafter may be referred to as water-containing particles) is not particularly limited, but preferably 0.1 to 4% by weight. When the water content is higher than 4% by weight and expansion ratio is high, pre-expanded particles tend to shrink easily after expansion. The water content can be adjusted by controlling the amount of fillers in the polyolefin resin composition, heating temperature and heating time. For example, it is adjusted by dispersing polyolefin resin particles in an aqueous dispersion medium, heating the mixture to temperature of at least the softening temperature of the polyolefin resin, pressurizing the same, and stirring the same for 30 minutes to 12 hours.

As shown in FIG. 2, resin particles 4 may be released through a flow-restricting device equipped with a pipe 10, which is explained below.

A further alternative process for preparing pre-expanded particles having low fluctuation in expansion ratios comprises releasing polyolefin resin particles through a particular flow-restricting device equipped with a pipe (hereinafter may be referred to as a flow-restricting device) into an atmosphere of lower pressure than the inner pressure of the autoclave with keeping the inner pressure of the autoclave.

The flow-restricting device is generally used to control the releasing time and to achieve uniform expansion ratios. In the present invention, by using a flow-restricting device equipped with a pipe on an orifice board, spattering angle of released aqueous dispersion medium can be decreased, and thus resin particles can be expanded to obtain uniformly sized pre-expanded particles having low fluctuation in expansion ratios. Examples of orifice boards include those having an opening in the form of orifice, nozzle or venturi.

The autoclave used in this case is not particularly limited as long as the flow-restricting device of the present invention is provided, and conventional autoclaves can be used as they are.

Figure 5:
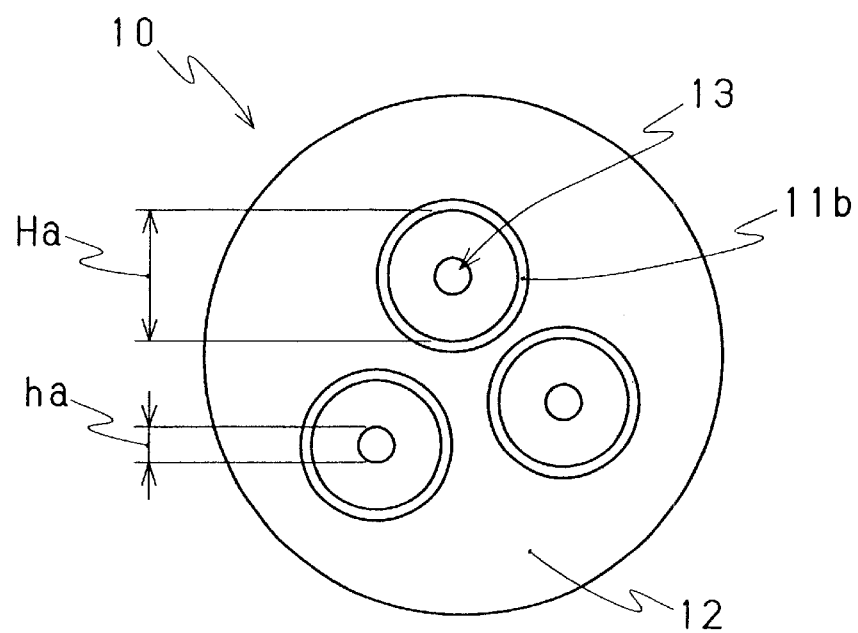
FIG. 5 is a front view of the flow-restricting device equipped with a circular pipe of the present invention.

As to the shape of the flow-restricting device, in case of using an orifice board, the lower limit of the diameter ($h_a$) of orifice 12 shown in FIG. 5 is preferably 0.5 mm, more preferably 1.0 mm, further preferably 2.0 mm, most preferably 2.5 mm, and the upper limit is preferably 6.0 mm, more preferably 4.0 mm. When the diameter is smaller than 0.5 mm, resin particles are likely to block the outlet. When the diameter is larger than 6.0 mm, pre-expanded particles to be obtained tend to have large fluctuation in expansion ratios.

Figure 6:
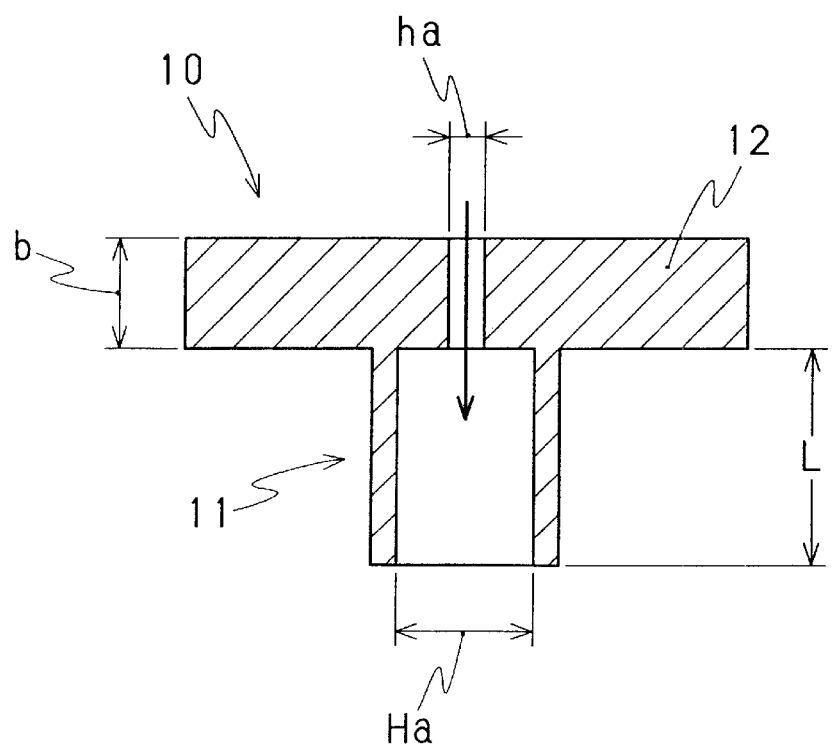
FIG. 6 is explanatory view illustrating an example of an axial cross-section of the flow-restricting device equipped with an orifice pipe of the present invention.

The thickness b of the orifice board 12 shown in FIG. 6 is preferably 0.2 to 10 mm, more preferably 0.5 to 5 mm. When the thickness is less than 0.2 mm, it is highly likely that the orifice board is broken owing to the pressure at releasing particles. When the thickness is more than 10 mm, there is a tendency that the expansion ratio of pre-expanded particles to be obtained is lowered, pre-expanded particles having desirable expansion ratio is difficult to obtain, and that resin particles block the outlet.

The pipe is integrally mounted on the releasing side of the orifice board. The material of the pipe is not particularly limited, but metal is used in general. The pipe may be integrally mounted on the orifice board by welding, engagement, screwing together or bonding. The pipe and orifice may be prepared as one unit, if necessary.

The open area of the pipe at the other side of the portion mounted on the orifice board is at least 1.3 times larger than the open area of the orifice. The open area of the pipe is preferably at least 3 times larger than that of the orifice though the are depends on the breadth and the length of the pipe. When the magnification is less than 1.3 times, coagulation or clogging of released pre-expanded particles is caused. Such problem does not occur when the pipe is short, but it becomes difficult to achieve the effect of using pipe.

The pipe may be a rectangular column 11a or a circular column 11b. In these cases, the open area of the pipe is shaped like slit or circle, respectively. The lower limit of H, which represents width of the front face of slit or minor axis of the front face of circle, is 0.6 mm, preferably 1.2 mm, more preferably 2 mm, most preferably 3 mm and the upper limit is preferably 25 mm. When width or minor axis H of the front face is shorter than 0.6 mm, the slit or hole tends to be blocked easily. Pipe length L is preferably at least 5 mm, more preferably at least 5 to 300 mm. When pipe length L is shorter than 5 mm, there is a tendency that spattering path of released aqueous dispersion shows little difference with the spattering path in case of using a flow-restricting device without a pipe and effect of lowering fluctuation in expansion ratios is lowered. When pipe length L is longer than 300 mm, there is a tendency that pre-expanded particles are collided and fused with each other in the pipe and pre-expanded particles cannot be obtained.

The pipe may be shaped like a part of a pyramid or a circular cone. The portion which contact with the orifice board has an area similar to the open area of the orifice, but the open area of the pipe is larger at the side where the aqueous dispersion medium passed through the pipe is released.

In other words, although a dispersion which is a mixture of particles and water bursts into adiabatic expansion owing to pressure release once it passes through the orifice, by shaping the pipe in accordance with the spattering path of released dispersion, that is, in a form of a pyramid or a circular scone, dead space is reduced and therefore adhesion of particles and generation of turbulent flow are decreased to achieve a stable flow along the spattering path. It is considered that this contributes to the lowering of fluctuation in expansion ratios.

The optimal apex angle of a pyramid or a circular cone is not simply determined. An angle appropriate is experimentally determined in accordance with the spattering path which is affected by conditions such as composition of dispersion comprising particles and water, kinds of additives, temperature and pressure of the autoclave, and open area of orifice.

At most the same number of pipes as that of orifices (number of holes) is mounted on the flow-restricting device. A flow-restricting device having a plurality of holes is effective because productivity becomes high.

Figure 4:
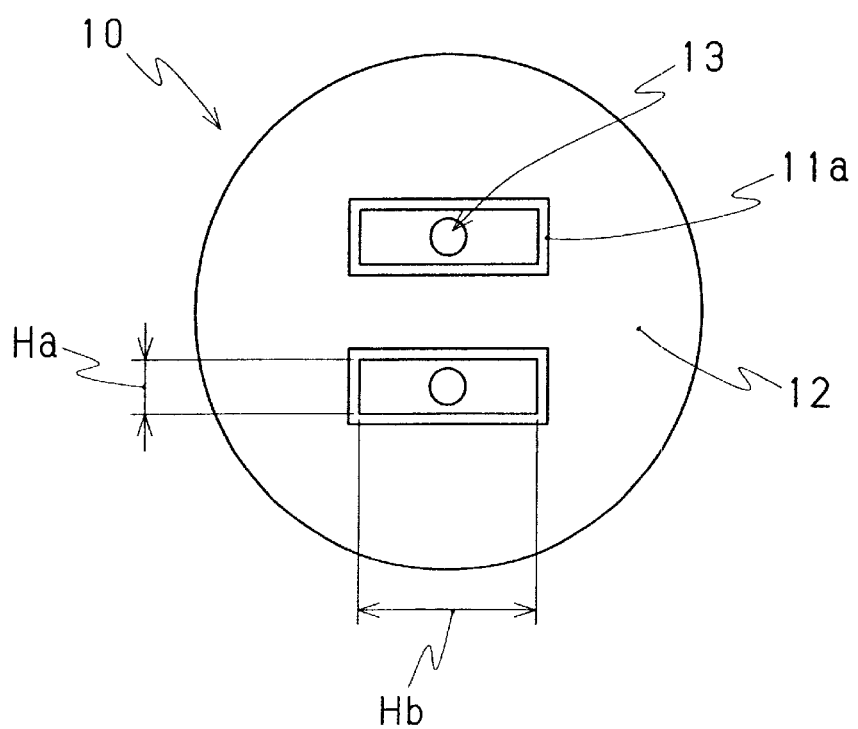
FIG. 4 is a front view of the flow-restricting device equipped with a slit pipe (rectangular column) of the present invention.

In the next place, determination of width $H_a$ of the front face of slit or minor axis of the front face of circle, and pipe length L of the pipe of the flow-restricting device equipped with a pipe 10 is explained with reference to FIG. 4 and FIG. 6. Herein, size of pipe refers to the bore diameter of the pipe.

The slit form of the present invention refers to polygonal through holes such as rectangle, square, diamond, trapezoid, parallelogram, other quadrangles, triangle, pentagon and hexagon. The circle-shaped through hole of the present invention refers to a through hole in the form of a circle, ellipse, or rectangle or square with semicircles on opposed sides, whose diameter is the length of the side of the rectangle or square. As shown in FIG. 4, when the through hole is in the form of a rectangle, the long side $H_b$ corresponds to width or major axis, and the short side $H_a$ corresponds to height or minor axis ($H_a$ and $H_b$ have the same length in case of square). When the through hole is trapezoid, the larger one of base and height corresponds to width or major axis and the shorter one corresponds to height or minor axis. In case of other slit forms, the longest one of the segments of a line passing through the barycenter of the opening part, which are cut off by the side corresponds to major axis, and the shortest one corresponds to minor axis. In case of ellipse, the line of apsides corresponds to width or major axis and the minor axis corresponds to height or minor axis. In case of other circular holes, the longest one of the segments of a line passing through the barycenter of the opening part, which are cut off by the side corresponds to major axis, and the shortest one corresponds to minor axis. In the present invention, H refers to $H_a$ or $H_b$.

In addition, as shown in FIG. 6, pipe length L refers to length of a pipe from the surface of the orifice board 12.

When at least two pipes 11 are disposed on the flow-restricting device, pipe form is slit or circle, and all pipes may have the same form or all pipes may have different forms. The case where some pipes have the same form while other pipes have different form may be possible.

Figure 7:
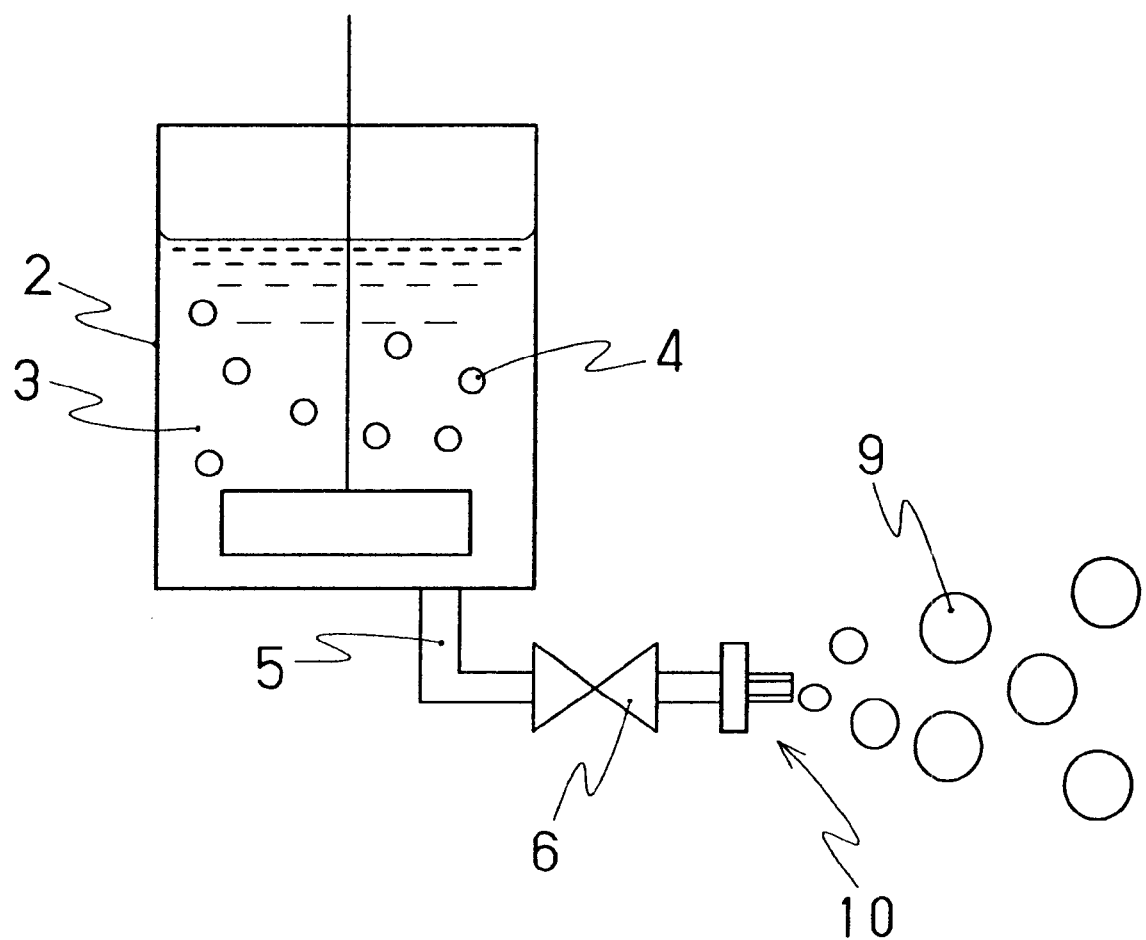
FIG. 7 is an explanatory view of apparatus for preparing pre-expanded particles having a flow-restricting device equipped with a pipe of the present invention.

The flow-restricting device equipped with a pipe 10 is generally disposed, for example, at the outlet of the releasing pipe 5 as shown in FIG. 7, but may be disposed between the bulb 6 below the autoclave 2 and the autoclave 2. It may be disposed not only at the outlet of the releasing pipe 5 but in the middle of the releasing pipe 5. In FIG. 7, numeral 4 represents resin particles, numeral 3 represents aqueous dispersion medium and numeral 9 represents pre-expanded particles.

The expansion ratio of pre-expanded particles obtained by the process are about 2 to 43 times, preferably about 2 to 40 times, more preferably about 3 to 30 times, further preferably about 3 to 20 times, and most preferably about 3 to 15 times. When the expansion ratio is less than 2 times, flexibility and cushioning property of pre-expanded molded articles to be obtained tend to be insufficient. When the expansion ratio is more than 43 times, mechanical strength and heat resistance of molded articles to be obtained tend to be insufficient. The closed cell content of the pre-expanded particles is 80 to 100%, preferably 90 to 100%. When the closed cell content is less than 80%, secondary expandability is insufficient and there is a tendency that bad fusion is caused to lower mechanical strength of molded articles to be obtained. The lower limit of the average cell diameter of pre-expanded particles is 10 $\mu$m, preferably 20 $\mu$m, more preferably 50 $\mu$m, most preferably 100 $\mu$m. The upper limit of the average cell diameter of pre-expanded particles is 500 $\mu$m, preferably 400 $\mu$m, more preferably 300 $\mu$m. When the average cell diameter is shorter than 10 $\mu$m, problem tends to be caused that molded articles to be obtained are deformed. When the average cell diameter is longer than 500 $\mu$m, mechanical strength of molded articles to be obtained tends to decrease. The fluctuation in expansion ratios of pre-expanded particles depends on conditions of expansion, but is usually about at most 20% in case of using volatile blowing agent and about at most 15%, particularly at most about 10% in case of using inorganic gas. This means that it is possible to obtain excellent pre-expanded particles having lower fluctuation in expansion ratios as compared with conventional cases where particles are not collided (which resulted in fluctuation in expansion ratios of about 30% with expansion ratio of 3 times; fluctuation in expansion ratios of about 20% with expansion ratio of 3.5 times in case of using a conventional flow-restricting device). Furthermore, when the fluctuation in expansion ratios are at most 20%, fluctuation in weights of molded articles to be obtained are lowered to increase product yield.

The polyolefin resin pre-expanded particles have closed cell content of at least 80%. Accordingly, known molding methods can be applied to prepare in-mold foamed articles. For example, the pre-expanded particles may be treated for a predetermined period under heating and pressurization in an autoclave to impregnate air, then filled into a mold and heated by vapor to carry out in-mold foaming to prepare a molded article having shape of the mold.

The thus obtained molded articles have a high commercial value since they are excellent in flexibility and cushioning property, and what is more, they have lower dimensional shrinkage ratio and less shape deformation.

EXAMPLE

The process for preparing of present invention is explained through Examples below, but the present invention is not limited thereto.

In Examples "part" and "%" represent "part by weight" and "% by weight", respectively, unless otherwise specified.

Examples 1 to 3

To a 50 mm$\phi$ single screw extruder were fed 100 parts of a polyolefin resin, i.e. an ethylene-propylene random copolymer (having density of 0.90 g/cm$^3$, an ethylene content of 3%, melting point of 145° C., MI of 5.5 g/10 minutes, flexural modulus of 1,000 MPa), 2 parts of an ionomer obtained by neutralizing a carboxyl group of an ethylene-methacrylic acid copolymer with sodium ion which comprises 85% of ethylene unit and 15% of methacrylic acid unit (MI of 0.9 g/10 minutes, melting point of 89° C. and water absorption ratio of 1%), and 0.3 part of talc (average particle diameter of 7 $\mu$m) as an inorganic filler. The mixture was melt-kneaded, and extruded from a cylindrical die having diameter of 1.5 mm$\phi$, and then cooled by water. Thereafter, the mixture was cut with a cutter to obtain resin composition particles (pellet) comprising a columnar polyolefin resin composition (1.8 mg/particle). The obtained resin composition particles had melting point of 145° C. and density of 0.90 g/cm$^3$ measured according to JIS K 7112.

An autoclave 2 shown in FIG. 1 was charged with 100 parts (1.5 kg) of the obtained resin composition particles (whose water content measured at oil bath temperature of 154.5° C. according to the above method was 5.0%), 0.5 part of calcium tertiary phosphate as a dispersion agent and 0.01 part of sodium n-paraffinsulfonate as a dispersion auxiliary agent together with 300 parts of water. The aqueous dispersion in the autoclave was heated to 155.0° C. with stirring. The inner pressure of the autoclave was about 0.5 MPa at that time. It was then raised to 0.8 to 3.0 MPa by compressing with air so that expansion ratio became 15 times. After that, a valve 6 provided at a lower part of the autoclave was immediately opened to release the aqueous dispersion (containing the resin composition particles and the aqueous dispersion medium) through an release port 7 wherein a collision board 1 was disposed at a distance from the release port shown in Table 1. The aqueous dispersion was allowed to collide with the collision board 1 to obtain pre-expanded particles having closed cell structure. During release, air was introduced into the autoclave to keep pressure of the autoclave.

Examples 4 to 5

To a 50 mmφ single screw extruder were fed 100 parts of a polyolefin resin, i.e. an ethylene-propylene random copolymer (having density of 0.90 g/cm³, an ethylene content of 3%, melting point of 145° C., MI of 5.5 g/10 minutes, flexural modulus of 1,000 MPa), and 0.1 part of talc (average particle diameter of 7 μm) as an inorganic filler. The mixture was melt-kneaded, and extruded from a cylindrical die having diameter of 1.5 mmφ, and then cooled by water. Thereafter, the mixture was cut with a cutter to obtain resin composition particles (pellet) comprising a columnar polyolefin resin composition (1.8 mg/particle). The obtained resin composition particles had melting point of 145° C. and density of 0.90 g/cm³ measured according to JIS K 7112.

An autoclave 2 shown in FIG. 1 was charged with 100 parts (1.5 kg) of the obtained resin composition particles (whose water content measured at oil bath temperature of 154.5° C. according to the above method was 5.0%), 1.5 parts of calcium tertiary phosphate as a dispersion agent and 0.03 part of sodium n-paraffinsulfonate as a dispersion auxiliary agent together with 300 parts of water. Twelve parts of butane was pressed into the aqueous dispersion in the autoclave with stirring. Thereafter, the aqueous dispersion in the autoclave was heated to 140° C. with stirring. The inner pressure of the autoclave was about 1.5 MPa at that time. With maintaining the inner pressure with butane to adjust the expansion ratio to 15 times, the valve 6 was opened to release the aqueous dispersion (containing the resin composition particles and the aqueous dispersion medium) through an release port 7 wherein a collision board 1 was disposed at a distance from the release port shown in Table 1. The aqueous dispersion was allowed to collide with the collision board 1 to obtain pre-expanded particles having closed cell structure.

Comparative Example 1

The same procedures as in Examples 1, 2, and 3 were carried out to obtain pre-expanded particles except that the collision board 1 was not disposed.

Comparative Example 2

The same procedures as in Examples 4 and 5 were carried out to obtain pre-expanded particles except that the collision board 1 was not disposed.

Comparative Example 3

The same procedures as in Examples 4 and 5 were carried out to obtain pre-expanded particles except for changing a distance from the release port shown in Table 1.

[Expansion Ratio]

Pre-expanded particles were weighed in amount of 3 to 10 g and dried at 60° C. for at least 6 hours. The dry weight (w) was measured and the volume (v) thereof was then measured by immersing the particles in water, followed by calculation of the true specific gravity $\rho_b = w/v$ of the pre-expanded particles. According to the ratio of the density of the material composition ($\rho_r$) to the true specific gravity ($\rho_b$), expansion ratio $K = \rho_r/\rho_b$ was calculated.

TABLE 1

| | Pressurizing gas | Distance D from release port to collision board (mm) | Expansion ratio (−) | Fluctuation in expansion ratios σ/Xp (%) | Effect to lower fluctuation in expansion ratios (Compared between cases where the same gas is used) |
|---|---|---|---|---|---|
| Ex. No. 1 | Air | 50 | 15 | 4 | lowered by 73% |
| Ex. No. 2 | Air | 500 | 15 | 5 | lowered by 67% |
| Ex. No. 3 | Air | 1500 | 15 | 11 | lowered by 27% |
| Ex. No. 4 | Butane | 500 | 15 | 13 | lowered by 41% |
| Ex. No. 5 | Butane | 1500 | 15 | 18 | lowered by 18% |
| Com. Ex. No. 1 | Air | — | 15 | 15 | — |
| Com. Ex. No. 2 | Butane | — | 15 | 22 | — |
| Com. Ex. No. 3 | Butane | 3 | Particles are fused with each other at release port. Expansion is impossible. | | |

Table 1 shows that, when butane or air was used as pressurizing gas, fluctuation in expansion ratio was reduced and the effect to lower fluctuation in expansion ratio of the rubber composition was increased by colliding all of the pre-expanded particles released through a release port with a collision board disposed at a distance of at least 5 mm from the release port as compared with the case without collision board. Furthermore, it is more preferable to use air which is inorganic gas as pressurizing gas because the effect of the present invention is revealed remarkably from the viewpoint that air has larger effect to lower fluctuation in expansion ratios than butane.

Example 6

To a 50 mmφ single screw extruder was fed a polyolefin resin, i.e. an ethylene-propylene random copolymer (having density of 0.90 g/cm³, an ethylene content of 3%, melting point of 145° C., MI of 5.5 g/10 minutes, flexural modulus of 1,000 MPa). The mixture was melt-kneaded, and extruded from a cylindrical die having diameter of 1.5 mmφ, and then cooled by water. Thereafter, the mixture was cut with a cutter to obtain resin particles (pellet) comprising a columnar polyolefin resin composition (1.8 mg/particle). The obtained resin particles had melting point of 145° C. and density of 0.90 g/cm³ measured according to JIS K7112.

An autoclave 2 shown in FIG. 1 was charged with 100 parts of the obtained resin particles (whose water content measured at oil bath temperature of 154.5° C. according to the above method was 0.8%), 0.5 part of calcium tertiary phosphate as a dispersion agent and 0.01 part of sodium n-paraffinsulfonate as a dispersion auxiliary agent together with 300 parts of water. The aqueous dispersion in the autoclave was heated to 155.0° C. with stirring. The inner pressure of the autoclave 2 was about 0.5 MPa at that time. This temperature was maintained for 60 minutes. The inner pressure of the autoclave was then raised to 1.0 MPa by compressing with air. After that, a valve 6 provided at a lower part of the autoclave was immediately opened to release the aqueous dispersion (containing the resin particles and the aqueous dispersion medium) through a flow-restricting device having 1 hole which has diameter of 5 mm wherein a collision board 1 was disposed at distance of 300 mm from the release port. The aqueous dispersion was allowed to collide with the collision board 1 at a collision angle of 90 degrees relative to the release direction to obtain pre-expanded particles having closed cell structure wherein an average diameter of a cell at the side of the collided face was different from that at the other side of the collided face. An atmosphere of a low-pressure vessel 8 was filled with 100° C. of saturated steam before release. During release, air was introduced into the autoclave to keep pressure of the autoclave. In this experiment, the face of pre-expanded particles, which was collided with the collision board, was determined by coloring the collision board and transferring the color to pre-expanded particles.

Examples 7 to 9

The same procedures as in Example 6 was carried out to obtain pre-expanded particles except for changing the inner pressure of the autoclave 2 to 1.5, 3.0, or 4.5 MPa, respectively.

Example 10

To a 50 mm$\phi$ single screw extruder was fed a polyolefin resin, i.e. an ethylene-propylene random copolymer (having density of 0.90 g/cm$^3$, an ethylene content of 3%, melting point of 145° C., MI of 5.5 g/10 minutes, flexural modulus of 1,000 MPa). The mixture was melt-kneaded, and extruded from a cylindrical die having diameter of 1.5 mm$\phi$, and then cooled by water. Thereafter, the mixture was cut with a cutter to obtain resin particles (pellet) comprising a columnar polyolefin resin composition (1.8 mg/particle). The obtained resin particles had melting point of 145° C. and density of 0.90 g/cm$^3$ measured according to JIS K 7112.

An autoclave 2 shown in FIG. 2 was charged with 100 parts of the obtained resin particles (whose water content measured at oil bath temperature of 154.5° C. according to the above method was 0.8%), 0.5 part of calcium tertiary phosphate as a dispersion agent and 0.01 part of sodium n-paraffinsulfonate as a dispersion auxiliary agent together with 300 parts of water. The aqueous dispersion in the autoclave was heated to 155.0° C. with stirring. The inner pressure of the autoclave 2 was about 0.5 MPa at that time. This temperature was maintained for 60 minutes. The inner pressure of the autoclave was then raised to 1.0 MPa by compressing with air. After that, a valve 6 provided at a lower part of the autoclave was immediately opened to release the aqueous dispersion (containing the resin particles and the aqueous dispersion medium) through a flow-restricting device having 1 hole which has diameter of 5 mm and a flow-restricting device equipped with a pipe 10 which has diameter of 10 mm wherein a collision board 1 was disposed at distance of 300 mm from the release port. The aqueous dispersion was allowed to collide with the collision board 1 at a collision angle of 90 degrees relative to the release direction to obtain pre-expanded particles having closed cell structure wherein an average diameter of a cell at the side of the collided face was different from that at the other side of the collided face. An atmosphere of a low-pressure vessel 8 was filled with 100° C. of saturated steam before release. During release, air was introduced into the autoclave to keep pressure of the autoclave.

Example 11

The same procedures as in Example 10 was carried out to obtain pre-expanded particles except for changing the inner pressure of the autoclave to 3.0 MPa.

Examples 12 to 13

The same procedures as in Example 6 was carried out to obtain pre-expanded particles except for changing the inner pressure of the autoclave to 1.5 or 3.0 MPa, respectively and changing the collision angle to 60 degrees relative to the release direction, respectively.

Examples 14 to 15

The same procedures as in Example 10 was carried out to obtain pre-expanded particles except for changing the inner pressure of the autoclave to 1.5 or 3.0 MPa, respectively and changing the collision angle to 60 degrees relative to the release direction, respectively.

Example 16

The same procedures as in Example 6 was carried out to obtain pre-expanded particles except for changing the inner pressure of the autoclave to 3.0 MPa and changing the collision angle to 20 degrees relative to the release direction.

Example 17

The same procedures as in Example 10 was carried out to obtain pre-expanded particles except for changing the inner pressure of the autoclave to 3.0 MPa and changing the collision angle to 20 degrees relative to the release direction.

Example 18

To a 50 mm$\phi$ single screw extruder were fed 100 parts of a polyolefin resin, i.e. an ethylene-propylene random copolymer (having density of 0.90 g/cm$^3$, an ethylene content of 3%, melting point of 145° C., MI of 5.5 g/10 minutes, flexural modulus of 1,000 MPa), and 2.0 parts of calcium carbonate as an inorganic filler. The mixture was melt-kneaded, and extruded from a cylindrical die having diameter of 1.5 mm$\phi$, and then cooled by water. Thereafter, the mixture was cut with a cutter to obtain resin particles (pellet) comprising a columnar polyolefin resin composition (1.8 mg/particle). The obtained resin particles had melting point of 145° C. and density of 0.94 g/cm$^3$ measured according to JIS K 7112 when the amount of calcium carbonate was 2.0 parts, though the density depended on the amount of calcium carbonate.

An autoclave 2 shown in FIG. 1 was charged with 100 parts (1.5 kg) of the obtained resin particles (whose water content measured at oil bath temperature of 154.5° C. according to the above method was 2.5% when the amount of calcium carbonate was 2.0 parts, though the water content depended on the amount of calcium carbonate), 0.5 part of calcium tertiary phosphate as a dispersion agent and 0.01 part of sodium n-paraffinsulfonate as a dispersion auxiliary agent together with 300 parts of water. The aqueous dispersion in the autoclave was heated to 155.0° C. with stirring. The inner pressure of the autoclave was about 0.5 MPa at that time. Thereafter, the inner pressure of the autoclave was raised to 1.5 MPa by compressing with air. Then, pre-expanded particles were obtained according to the same procedures as in Example 6.

Example 19

The same procedures as in Example 18 was carried out to obtain pre-expanded particles except for changing the inner pressure of the autoclave to 3.0 MPa.

Examples 20 to 21

The same procedures as in Example 18 was carried out to obtain pre-expanded particles except for changing the inner pressure of the autoclave to 1.5 or 3.0 MPa, respectively and disposing a flow-restricting device equipped with a pipe at a release port in both examples.

Examples 22 to 23

The same procedures as in Example 18 was carried out to obtain pre-expanded particles except for changing the inner pressure of the autoclave to 1.5 or 3.0 MPa, respectively and changing the collision angle to 20 degrees relative to the release direction in both examples.

Examples 24 to 25

The same procedures as in Example 18 was carried out to obtain pre-expanded particles except for changing the inner pressure of the autoclave to 1.5 or 3.0 MPa, respectively, changing the collision angle to 20 degrees relative to the release direction and disposing a flow-restricting device equipped with a pipe at a release port in both examples.

Example 26

To a 50 mmφ single screw extruder were fed 100 parts of a polyolefin resin, i.e. an ethylene-propylene random copolymer (having density of 0.90 g/cm$^3$, an ethylene content of 3%, melting point of 145° C., MI of 5.5 g/10 minutes, flexural modulus of 1,000 MPa), and 2.0 parts of talc (average particle diameter of 7 μm) as an inorganic filler. The mixture was melt-kneaded, and extruded from a cylindrical die having diameter of 1.5 mmφ, and then cooled by water. Thereafter, the mixture was cut with a cutter to obtain resin particles (pellet) comprising a columnar polyolefin resin composition (1.8 mg/particle). The obtained resin particles had melting point of 145° C. and density of 0.94 g/cm$^3$ measured according to JIS K 7112 when the amount of talc was 2.0 parts, though the density depended on the amount of talc.

An autoclave 2 shown in FIG. 1 was charged with 100 parts (1.5 kg) of the obtained resin particles (whose water content measured at oil bath temperature of 154.5° C. according to the above method was 2.0% when the amount of talc was 2.0 parts, though the water content depended on the amount of talc), 0.5 part of calcium tertiary phosphate as a dispersion agent and 0.01 part of sodium n-paraffinsulfonate as a dispersion auxiliary agent together with 300 parts of water. The aqueous dispersion in the autoclave was heated to 155.0° C. with stirring. The inner pressure of the autoclave was about 0.5 MPa at that time. Thereafter, the inner pressure of the autoclave was raised to 1.5 MPa by compressing with air. Then, pre-expanded particles were obtained according to the same procedures as in Example 6.

Example 27

The same procedures as in Example 26 was carried out to obtain pre-expanded particles except for changing the inner pressure of the autoclave to 3.0 MPa.

Examples 28 to 29

The same procedures as in Example 26 was carried out to obtain pre-expanded particles except for changing the inner pressure of the autoclave to 1.5 or 3.0 MPa, respectively and disposing a flow-restricting device equipped with a pipe at a release port in both examples.

Example 30

To a 50 mmφ single screw extruder were fed 100 parts of a polyolefin resin, i.e. an ethylene-propylene random copolymer (having density of 0.90 g/cm$^3$, an ethylene content of 3%, melting point of 145° C., MI of 5.5 g/10 minutes, flexural modulus of 1,000 MPa), and 0.01 part of talc (average particle diameter of 7 μm) as an inorganic filler. The mixture was melt-kneaded, and extruded from a cylindrical die having diameter of 1.5 mmφ, and then cooled by water. Thereafter, the mixture was cut with a cutter to obtain resin particles (pellet) comprising a columnar polyolefin resin composition (1.8 mg/particle). The obtained resin particles had melting point of 145° C. and density of 0.90 g/cm$^3$ measured according to JIS K 7112 when the amount of calcium carbonate was 0.01 part, though the density depended on the amount of talc.

An autoclave 2 shown in FIG. 3 was charged with 100 parts (1.5 kg) of the obtained resin particles (whose water content measured at oil bath temperature of 154.5° C. according to the above method was 0.8% when the amount of talc was 0.01 part, though the water content depended on the amount of talc), 0.5 part of calcium tertiary phosphate as a dispersion agent and 0.01 part of sodium n-paraffinsulfonate as a dispersion auxiliary agent together with 300 parts of water. The aqueous dispersion in the autoclave was heated to 155.0° C. with stirring. The inner pressure of the autoclave was about 0.5 MPa at that time. Thereafter, the inner pressure of the autoclave was raised to 1.5 MPa by compressing with air. The flow-restricting device equipped with a pipe was disposed at the release port and the collision angle was changed to 20 degrees relative to the release direction. Then, pre-expended particles were obtained according to the same procedure as in Example 6.

Example 31

The same procedures as in Example 30 was carried out to obtain pre-expanded particles except for changing the inner pressure of the autoclave to 3.0 MPa.

Examples 32 to 33

The same procedures as in Example 30 was carried out to obtain pre-expanded particles except for changing the inner pressure of the autoclave to 1.5 or 3.0 MPa, respectively and changing the amount of talc to 0.15 part in both examples.

Examples 34 to 35

The same procedures as in Example 30 was carried out to obtain pre-expanded particles except for changing the inner pressure of the autoclave to 1.5 or 3.0 MPa, respectively and changing the amount of talc to 2.0 parts in both examples.

Examples 36 to 37

The same procedures as in Example 30 was carried out to obtain pre-expanded particles except for changing the inner pressure of the autoclave to 3.0 MPa, changing the amount of talc to 0.15 part, further adding 2.0 parts of an ionomer to the mixture in both examples, and changing the collision angle relative to the release direction to 90 or 20 degrees, respectively.

Examples 38 to 40

The same procedures as in Example 30 was carried out to obtain pre-expanded particles except for changing the inner pressure of the autoclave to 3.0 MPa, changing the amount of talc to 0.15 part in these examples, and changing the distance between the collision board and the release port to 50, 1,000, 1500 mm, respectively.

Comparative Example 4

The same procedures as in Example 6 was carried out to obtain pre-expanded particles except that the collision board was not disposed, the atmosphere of the low-pressure vessel in which resin particles are expanded was filled with air of 25° C. and the inner pressure of the autoclave was changed to 3.0 MPa.

Comparative Example 5

The same procedures as in Example 30 was carried out to obtain pre-expanded particles except that the collision board was not disposed, the atmosphere of the low-pressure vessel in which resin particles are expanded was filled with air of 25° C., the amount of talc was changed to 2.0 parts and the inner pressure of the autoclave was changed to 3.0 MPa.

Comparative Examples 6 to 7

The same procedures as in Example 10 was carried out to obtain pre-expanded particles except for filling the atmosphere of the low-pressure vessel in which resin particles are expanded with air of 25° C., further adding 2.0 parts of talc to the mixture, changing the inner pressure of the autoclave to 3.0 MPa in both examples, and changing the collision angle to 90 or 20 degrees relative to the release direction, respectively.

Comparative Example 8

The same procedures as in Example 30 was carried out to obtain pre-expanded particles except that the collision board was not disposed, the amount of talc was changed to 2.0 parts and the inner pressure of the autoclave was changed to 3.0 MPa.

Comparative Examples 9 to 10

The same procedures as in Example 30 was carried out to obtain pre-expanded particles except for filling the atmosphere of the low-pressure vessel in which resin particles are expanded with air of 25° C., changing the amount of talc to 0.15 part, changing the inner pressure of the autoclave to 3.0 MPa, further adding 2.0 parts of an ionomer to the mixture in both examples, and changing the collision angle to 90 or 20 degrees relative to the release direction, respectively.

Comparative Example 11

The same procedures in Example 30 was carried out to obtain pre-expanded particles except that the collision board was not disposed, the amount of talc was changed to 0.15 part and the inner pressure of the autoclave was changed to 3.0 MPa.

TABLE 2

|  | Ex. No. 6 | Ex. No. 7 | Ex. No. 8 | Ex. No. 9 | Ex. No. 10 | Ex. No. 11 | Ex. No. 12 |
|---|---|---|---|---|---|---|---|
| Atmosphere of expansion | 100° C. Water vapor | 100° C. Water vapor | 100° C. Water vapor | 100° C. Water vapor | 100° C. Water vapor | 100° C. Water vapor | 100° C. Water vapor |
| Collision angle (°) | 90 | 90 | 90 | 90 | 90 | 90 | 60 |
| Distance from release port to collision board (mm) | 300 | 300 | 300 | 300 | 300 | 300 | 300 |
| Drawing board | Without cylinder | Without cylinder | Without cylinder | Without cylinder | With cylinder | With cylinder | Without cylinder |
| Inorganic filler |  |  |  |  |  |  |  |
| kind | — | — | — | — | — | — | — |
| part (phr) | — | — | — | — | — | — | — |
| Pressure (MPa) | 1.0 | 1.5 | 3.0 | 4.5 | 1.5 | 3.0 | 1.5 |
| Amount of ionomer (phr) | 0 | 0 | 0 | 0 | 0 | 0 | 0 |
| Bulk density of pre-expanded particles (g/L) | 145 | 125 | 55 | 17 | 125 | 55 | 130 |
| Expansion ratio | 3.5 | 4.0 | 10.0 | 30.0 | 4.0 | 10.0 | 38 |
| Fluctuation in expansion ratios (%) | 15 | 12 | 8 | 6 | 10 | 5 | 11 |
| Average cell diameter on the side of collided face ($\mu$m) | 40 | 30 | 20 | 10 | 30 | 20 | 180 |
| Average cell diameter on the other side of collided face ($\mu$m) | 350 | 310 | 190 | 140 | 310 | 190 | 290 |

TABLE 3

|  | Ex. No. 13 | Ex. No. 14 | Ex. No. 15 | Ex. No. 16 | Ex. No. 17 | Ex. No. 18 | Ex. No. 19 |
|---|---|---|---|---|---|---|---|
| Atmosphere of expansion | 100° C. Water vapor | 100° C. Water vapor | 100° C. Water vapor | 100° C. Water vapor | 100° C. Water vapor | 100° C. Water vapor | 100° C. Water vapor |
| Collision angle (°) | 60 | 60 | 60 | 20 | 20 | 90 | 90 |
| Distance from release port to collision board (mm) | 300 | 300 | 300 | 300 | 300 | 300 | 300 |
| Drawing board | Without cylinder | With cylinder | With cylinder | Without cylinder | With cylinder | Without cylinder | Without cylinder |
| Inorganic filler |  |  |  |  |  |  |  |
| kind | — | — | — | — | — | Calcium carbonate | Calcium carbonate |
| part (phr) | — | — | — | — | — | 2.0 | 2.0 |
| Pressure (MPa) | 3.0 | 1.5 | 3.0 | 3.0 | 3.0 | 1.5 | 3.0 |
| Amount of ionomer (phr) | 0 | 0 | 0 | 0 | 0 | 0 | 0 |
| Bulk density of pre-expanded | 61 | 130 | 61 | 65 | 65 | 97 | 32 |

TABLE 3-continued

|  | Ex. No. 13 | Ex. No. 14 | Ex. No. 15 | Ex. No. 16 | Ex. No. 17 | Ex. No. 18 | Ex. No. 19 |
|---|---|---|---|---|---|---|---|
| particles (g/L) |  |  |  |  |  |  |  |
| Expansion ratio | 8.9 | 3.8 | 8.9 | 8.4 | 8.4 | 5.5 | 17 |
| Fluctuation in expansion ratios (%) | 6 | 10 | 4 | 5 | 4 | 7 | 4 |
| Average cell diameter on the side of collided face ($\mu$m) | 150 | 170 | 140 | 180 | 180 | 20 | 10 |
| Average cell diameter on the other side of collided face ($\mu$m) | 180 | 300 | 190 | 180 | 180 | 210 | 150 |

TABLE 4

|  | Ex. No. 20 | Ex. No. 21 | Ex. No. 22 | Ex. No. 23 | Ex. No. 24 | Ex. No. 25 | Ex. No. 26 |
|---|---|---|---|---|---|---|---|
| Atmosphere of expansion | 100° C. Water vapor | 100° C. Water vapor | 100° C. Water vapor | 100° C. Water vapor | 100° C. Water vapor | 100° C. Water vapor | 100° C. Water vapor |
| Collision angle (°) | 90 | 90 | 20 | 20 | 20 | 20 | 90 |
| Distance from release port to collision board (mm) | 300 | 300 | 300 | 300 | 300 | 300 | 300 |
| Drawing board | With cylinder | With cylinder | Without cylinder | Without cylinder | With cylinder | With cylinder | Without cylinder |
| Inorganic filler |  |  |  |  |  |  |  |
| kind | Calcium carbonate | Calcium carbonate | Calcium carbonate | Calcium carbonate | Calcium carbonate | Calcium carbonate | Calcium carbonate |
| part (phr) | 2.0 | 2.0 | 2.0 | 2.0 | 2.0 | 2.0 | 2.0 |
| Pressure (MPa) | 1.5 | 3.0 | 1.5 | 3.0 | 1.5 | 3.0 | 1.5 |
| Amount of ionomer (phr) | 0 | 0 | 0 | 0 | 0 | 0 | 0 |
| Bulk density of pre-expanded particles (g/L) | 97 | 30 | 101 | 35 | 100 | 35 | 95 |
| Expansion ratio | 5.5 | 19 | 5.3 | 15.5 | 5.4 | 15.5 | 5.6 |
| Fluctuation in expansion ratios (%) | 6 | 3 | 7 | 4 | 6 | 3 | 6 |
| Average cell diameter on the side of collided face ($\mu$m) | 20 | 10 | 200 | 140 | 200 | 140 | 20 |
| Average cell diameter on the other side of collided face ($\mu$m) | 210 | 150 | 200 | 140 | 200 | 140 | 210 |

TABLE 5

|  | Ex. No. 27 | Ex. No. 28 | Ex. No. 29 | Ex. No. 30 | Ex. No. 31 | Ex. No. 32 | Ex. No. 33 |
|---|---|---|---|---|---|---|---|
| Atmosphere of expansion | 100° C. Water vapor | 100° C. Water vapor | 100° C. Water vapor | 100° C. Water vapor | 100° C. Water vapor | 100° C. Water vapor | 100° C. Water vapor |
| Collision angle (°) | 90 | 90 | 90 | 20 | 20 | 20 | 20 |
| Distance from release port to collision board (mm) | 300 | 300 | 300 | 300 | 300 | 300 | 300 |
| Drawing board | Without cylinder | With cylinder | With cylinder | With cylinder | With cylinder | With cylinder | With cylinder |
| Inorganic filler |  |  |  |  |  |  |  |
| kind | Talc | Talc | Talc | Talc | Talc | Talc | Talc |
| part (phr) | 2.0 | 2.0 | 2.0 | 0.01 | 0.01 | 0.15 | 0.15 |
| Pressure (MPa) | 3.0 | 1.5 | 3.0 | 1.5 | 3.0 | 1.5 | 3.0 |
| Amount of ionomer (phr) | 0 | 0 | 0 | 0 | 0 | 0 | 0 |
| Bulk density of pre-expanded particles (g/L) | 30 | 95 | 31 | 115 | 42 | 95 | 40 |
| Expansion ratio | 18 | 5.6 | 17 | 4.7 | 13 | 5.6 | 14 |
| Fluctuation in expansion ratios (%) | 3 | 5 | 3 | 9 | 4 | 7 | 3 |
| Average cell diameter on the side of collided face ($\mu$m) | 20 | 20 | 10 | 270 | 230 | 190 | 160 |
| Average cell diameter on the other side of collided face ($\mu$m) | 90 | 210 | 80 | 270 | 230 | 190 | 160 |

TABLE 6

|  | Ex. No. 34 | Ex. No. 35 | Ex. No. 36 | Ex. No. 37 | Ex. No. 38 | Ex. No. 39 | Ex. No. 40 |
|---|---|---|---|---|---|---|---|
| Atmosphere of expansion | 100° C. Water vapor | 100° C. Water vapor | 100° C. Water vapor | 100° C. Water vapor | 100° C. Water vapor | 100° C. Water vapor | 100° C. Water vapor |
| Collision angle (°) | 20 | 20 | 90 | 20 | 20 | 20 | 20 |
| Distance from release port to collision board (mm) | 300 | 300 | 300 | 300 | 50 | 1000 | 1500 |
| Drawing board | Without cylinder | With cylinder | With cylinder | With cylinder | With cylinder | With cylinder | With cylinder |
| Inorganic filler |  |  |  |  |  |  |  |
| kind | Talc | Talc | Talc | Talc | Talc | Talc | Talc |
| part (phr) | 2.0 | 2.0 | 0.15 | 0.15 | 0.15 | 0.15 | 0.15 |
| Pressure (MPa) | 1.5 | 3.0 | 3.0 | 3.0 | 3.0 | 3.0 | 3.0 |
| Amount of ionomer (phr) | 0 | 0 | 2.0 | 2.0 | 0 | 0 | 0 |
| Bulk density of pre-expanded particles (g/L) | 92 | 31 | 40 | 43 | 38 | 42 | 44 |
| Expansion ratio | 5.8 | 17 | 14 | 13 | 15 | 13 | 12 |
| Fluctuation in expansion ratios (%) | 5 | 1.5 | 9 | 7 | 3 | 5 | 6 |
| Average cell diameter on the side of collided face (μm) | 150 | 110 | 20 | 110 | 140 | 150 | 160 |
| Average cell diameter on the other side of collided face (μm) | 150 | 110 | 120 | 110 | 140 | 150 | 160 |

TABLE 7

|  | Com. Ex. No. 4 | Com. Ex. No. 5 | Com. Ex. No. 6 | Com. Ex. No. 7 | Com. Ex. No. 8 | Com. Ex. No. 9 | Com. Ex. No. 10 | Com. Ex. No. 11 |
|---|---|---|---|---|---|---|---|---|
| Atmosphere of expansion | 25° C. Air | 25° C. Air | 25° C. Air | 25° C. Air | 100° C. Water vapor | 25° C. Air | 25° C. Air | 100° C. Water vapor |
| Collision angle (°) | — | — | 90 | 20 | — | 90 | 20 | — |
| Distance from release port to collision board (mm) | 300 | — | 300 | 300 | — | 300 | 300 | — |
| Drawing board | Without cylinder | With cylinder | With cylinder | With cylinder | With cylinder | With cylinder | With cylinder | With cylinder |
| Inorganic filler |  |  |  |  |  |  |  |  |
| kind | — | Talc | Talc | Talc | Talc | Talc | Talc | Talc |
| part (phr) | — | 2.0 | 2.0 | 2.0 | 2.0 | 0.15 | 0.15 | 0.15 |
| Pressure (MPa) | 3.0 | 3.0 | 3.0 | 3.0 | 3.0 | 3.0 | 3.0 | 3.0 |
| Amount of ionomer (phr) | 0 | 0 | 0 | 0 | 0 | 2.0 | 2.0 | 2.0 |
| Bulk density of pre-expanded particles (g/L) | 90 | 82 | 75 | 80 | 60 | 75 | 80 | 65 |
| Expansion ratio | 6.5 | 7.3 | 8.0 | 7.5 | 10.0 | 8.0 | 7.5 | 9 |
| Fluctuation in expansion ratios (%) | 20 | 18 | 17 | 13 | 11 | 25 | 17 | 15 |
| Average cell diameter on the side of collided face (μm) | 130 | 90 | 20 | 140 | 120 | 10 | 110 | 120 |
| Average cell diameter on the other side of collided face (μm) | 130 | 90 | 90 | 140 | 120 | 70 | 110 | 120 |

Tables 2 to 7 show that excellent expansion ratio and fluctuation in expansion ratio of pre-expanded particles were both achieved in each Example by colliding pre-expanded particles with a collision board and filling the atmosphere of the low-pressure vessel in which resin particles are expanded with saturated steam of 100° C. On the other hand, these properties of pre-expanded particles in each Comparative Example were insufficient. Furthermore, expansion ratio and fluctuation in expansion ratios of pre-expanded particles were improved by disposing the flow-restricting device equipped with a pipe as compared with the case without the flow-restricting device equipped with a pipe. Moreover, pre-expanded particles which has uniform cell diameters could be obtained by reducing the collision angle.

Examples 41 to 45

To a 50 mmφ single screw extruder were fed 100 parts of a polyolefin resin, i.e. an ethylene-propylene random copolymer (having density of 0.90 g/cm³, an ethylene content of 3%, melting point of 145° C., MI of 5.5 g/10 minutes, flexural modulus of 1,000 MPa), 2 parts of an ionomer obtained by neutralizing a carboxyl group of an ethylene-methacrylic acid copolymer with sodium ion which comprises 85% of ethylene unit and 15% of methacrylic acid unit (MI of 0.9 g/10 minutes, melting point of 89° C. and water absorption ratio of 1%), and 0.3 part of talc (average particle diameter of 7 μm) as an inorganic filler. The mixture was melt-kneaded, and extruded from a cylindrical die having diameter of 1.5 mmφ, and then cooled by water. Thereafter, the mixture was cut with a cutter to obtain resin particles (pellet) comprising a columnar polyolefin resin composition (1.8 mg/particle). The obtained resin particles had melting point of 145° C. and density of 0.90 g/cm³ measured according to JIS K 7112.

An autoclave 2 shown in FIG. 7 was charged with 100 parts (1.5 kg) of the obtained resin particles (whose water content measured at oil bath temperature of 154.5° C. according to the above method was 5.0%), 0.5 part of calcium tertiary phosphate as a dispersion agent and 0.01 part of sodium n-paraffinsulfonate as a dispersion auxiliary agent together with 300 parts of water. The aqueous dispersion in the autoclave was heated to 155.0° C. with stirring. The inner pressure of the autoclave was about 0.5 MPa at that time. It was then raised to 1.0 MPa by compressing with air. After that, a valve 6 provided at a lower part of the autoclave was immediately opened to release the aqueous dispersion (containing the resin particles and the aqueous dispersion medium) through an orifice flow-restricting device equipped with a pipe which has size shown in Table 8 to an atmosphere of atmospheric pressure, and pre-expanded particles having closed cell structure was obtained. During release, air was introduced into the autoclave to avoid pressure drop but keep pressure of the autoclave.

Comparative Examples 12 to 13

The same procedures as in Examples 41 to 45 were carried out to obtain expanded particles except for substituting a conventional orifice flow-restricting device for the orifice flow-restricting device equipped with a pipe of the present invention.

Expansion ratio of the obtained expanded particles was measured according to the above method. The result was shown in Table 8.

TABLE 8

|  | Ex. No. 41 | Ex. No. 42 | Ex. No. 43 | Ex. No. 44 | Ex. No. 45 | Com. Ex. No. 12 | Com. Ex. No. 13 |
| --- | --- | --- | --- | --- | --- | --- | --- |
| Orifice drawing board |  |  |  |  |  |  |  |
| Shape of hole of drawing board | Circle | Circle | Circle | Circle | Circle | Circle | Circle |
| Diameter ha of hole of drawing board (mm) | 3.6 | 3.6 | 3.6 | 3.6 | 4.0 | 3.6 | 4.0 |
| Thickness b of drawing board (mm) | 5 | 5 | 5 | 5 | 5 | 5 | 5 |
| Shape of hole of cylinder | Circle | Circle | Circle | Circle | Circle | — | — |
| Diameter Ha of hole of cylinder (mm) | 7 | 7 | 20 | 25 | 7 | — | — |
| Cylinder length L (mm) | 50 | 5 | 5 | 75 | 30 | — | — |
| Results of evaluation |  |  |  |  |  |  |  |
| Expansion ratio | 3.3 | 3.7 | 4.0 | 3.7 | 3.2 | 3.8 | 3.3 |
| Fluctuation in expansion ratios (%) | 8.5 | 9.9 | 9.2 | 9.5 | 10.5 | 20.5 | 23.6 |

According to the present invention, pre-expanded particles having reduced fluctuation in expansion ratios and highly uniform size can be obtained by colliding pre-expanded particles released through a release port with a collision board or a container wall when particles are pre-expanded.

In addition, according to the present invention, pre-expanded particles having excellent expansion ratios and fluctuation in expansion ratios can be obtained by using air or nitrogen without using volatile blowing agent or carbon dioxide gas by colliding pre-expanded particles released through a release port with a collision board or a container wall, and filling an atmosphere of a low-pressure vessel in which resin particles are expanded with gas of at least 60° C. when particles are pre-expanded.

Furthermore, according to the present invention, pre-expanded particles having extremely low fluctuation in expansion ratios of at most 10% can be obtained by using a flow-restricting device equipped with a pipe of the present invention. Moreover, according to the present invention, stable steps and uniform expansion ratio can be achieved since spattering path of dispersion released through a release port is narrowed to prevent turbulent flow and adhesion of particles with each other by using a pipe shaped like a part of pyramid or circular cone.

Therefore, an in-mold foamed articles having excellent property can be obtained since yield is raised and fluctuation in weight of in-mold foamed article made of pre-expanded particles is reduced by improving hitting ratio of expanded ratio at the preparing step.

What is claimed is:

1. A process for preparing pre-expanded particles of a polyolefin resin, comprising steps of:

dispersing polyolefin resin particles into an aqueous dispersion medium in an autoclave;

heating said resin particles to temperature of at least the softening point of said polyolefin resin and pressuring the same;

releasing said resin particles from the autoclave through a release port into an atmosphere of lower pressure than the inner pressure of said autoclave;

thereby pre-expanding said resin particles, wherein at the releasing step, the resulting pre-expanded particles are collided with a collision board or a container wall located at a distance of farther than 5 mm from the release port.

2. The process of claim 1, wherein the pre-expanded particles are contacted with gas of at least 60° C. and collided with a collision board or a container wall located at a distance of farther than 5 mm from the release port.

3. The process of claim 1, wherein said pressurization is carried out by introducing inorganic gas selected from the group consisting of nitrogen gas, air and gas comprising those as a main component.

4. The process of claim 3, wherein the pressurization is carried out with a pressure of 0.6 to 7.5 MPa.

5. The process of claim 1, wherein said pre-expanded particles are collided with a collision board or a container wall at a collision angle of 5 to 85 degrees.

6. The process of claim 1, wherein said polyolefin resin particles are released through a flow-restricting device equipped with a pipe.

7. The process of claim 2, wherein said gas of at least 60° C. is selected from the group consisting of vapor, a mixture of vapor and air, heated air, mist-containing air, heated vapor and superheated vapor.

8. The process of claim 2, wherein said gas of at least 60° C. is saturated vapor.

9. The process of claim 6, wherein a pipe having an open area of 1.3 times larger than the open area of an orifice is integrally mounted on said flow-restricting device equipped with a pipe at the release side of an orifice board.

10. The process of claim 9, wherein said flow-restricting device is equipped with at least one pipe which has H of at least 0.6 mm and L of at least 5 mm, H representing a width or a minor axis of a front face of said pipe and L representing a pipe length.

11. The process of claim 10, wherein H is 3 to 25 mm and L is 5 to 300 mm.

12. The process of claim 1, wherein said polyolefin resin particles are is polypropylene resin particles.

13. The process of claim 1, wherein said polypropylene resin particles comprise 100 parts by weight of a polypropylene resin and 0.01 to 20 parts by weight of a hydrophilic polymer.

14. The process of claim 1, wherein said polyolefin resin particles contain 0.001 to 5 parts by weight of an inorganic filler.

15. The process of claim 14, wherein said inorganic filler is talc.

16. A polyolefin resin pre-expanded particle obtained by the process of claim 1.

* * * * *